US012750455B2

(12) United States Patent
Kihara et al.

(10) Patent No.: US 12,750,455 B2
(45) Date of Patent: Sep. 29, 2026

(54) METHOD OF CREATING COLOR CHART DATA, INFORMATION PROCESSING APPARATUS FOR CREATING COLOR CHART DATA, COLOR CHART, IMAGE FORMING SYSTEM, AND NON-TRANSITORY RECORDING MEDIUM

(71) Applicants: Hideyuki Kihara, Kanagawa (JP); Yusuke Taneda, Saitama (JP); Yuta Nagata, Yamaguchi (JP)

(72) Inventors: Hideyuki Kihara, Kanagawa (JP); Yusuke Taneda, Saitama (JP); Yuta Nagata, Yamaguchi (JP)

(73) Assignee: RICOH COMPANY, LTD., Tokyo (JP)

( * ) Notice: Subject to any disclaimer, the term of this patent is extended or adjusted under 35 U.S.C. 154(b) by 184 days.

(21) Appl. No.: 18/583,896

(22) Filed: Feb. 22, 2024

(65) Prior Publication Data

US 2024/0291931 A1 Aug. 29, 2024

(30) Foreign Application Priority Data

Feb. 28, 2023 (JP) ................................ 2023-030474

(51) Int. Cl.
*H04N 1/60* (2006.01)

(52) U.S. Cl.
CPC ................................ *H04N 1/6044* (2013.01)

(58) Field of Classification Search
None
See application file for complete search history.

(56) References Cited

U.S. PATENT DOCUMENTS 6,048,117 A * 4/2000 Banton .............. H04N 1/00002 400/74
8,681,375 B2 * 3/2014 Katayama ............ H04N 1/6055 358/1.9

(Continued)

FOREIGN PATENT DOCUMENTS

EP 1 146 726 A1 10/2001
EP 2 306 700 A2 4/2011

(Continued)

OTHER PUBLICATIONS

Extended European Search Report issued Jun. 7, 2024 in European Patent Application No. 24153780.2, 8 pages.

*Primary Examiner* — Helen Zong
(74) *Attorney, Agent, or Firm* — XSENSUS LLP

(57) ABSTRACT

A computer-implemented method of creating color chart data to be used for executing color adjustment on an image forming apparatus includes obtaining, from a color chart printed out by the image forming apparatus, color chart data including a color adjustment patch group in which a plurality of color patches used for executing the color adjustment are arranged adjacent to each other, determining, for one or more of the plurality of color patches included in the color adjustment patch group, whether color of the color patch and color of an adjacent color patch adjacent to the color patch are similar, and based on a determination that the color of the color patch and the color of the adjacent color patch are similar, creating color chart data in which the color patch and the adjacent color patch that are similar in color are arranged not to be adjacent to each other.

19 Claims, 12 Drawing Sheets

(56) References Cited

U.S. PATENT DOCUMENTS

| | | | | |
|---|---|---|---|---|
| 2001/0038459 | A1 * | 11/2001 | Mahy | H04N 1/6033 358/1.9 |
| 2011/0075223 | A1 * | 3/2011 | Katayama | H04N 1/6088 358/3.23 |
| 2016/0261773 | A1 * | 9/2016 | Tsuji | H04N 1/00023 |
| 2019/0037111 | A1 * | 1/2019 | Ezoe | H04N 1/6055 |
| 2022/0131982 | A1 | 4/2022 | Kihara et al. | |
| 2022/0141356 | A1 * | 5/2022 | Kihara | H04N 1/6072 358/1.9 |

FOREIGN PATENT DOCUMENTS

| | | | |
|---|---|---|---|
| EP | 3 993 380 | A1 | 5/2022 |
| JP | 2022-072441 | A | 5/2022 |
| WO | 2015/166797 | A1 | 11/2015 |
| WO | 2016/076163 | A1 | 5/2016 |

* cited by examiner

METHOD OF CREATING COLOR CHART DATA, INFORMATION PROCESSING APPARATUS FOR CREATING COLOR CHART DATA, COLOR CHART, IMAGE FORMING SYSTEM, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2023-030474, filed on Feb. 28, 2023, in the Japan Patent Office, the entire disclosure of which is hereby incorporated by reference herein.

BACKGROUND

Technical Field

Embodiments of the present disclosure relate to a method of creating color chart data, an information processing apparatus for creating color chart data, a color chart, an image forming system, and a non-transitory recording medium.

Related Art

Printing companies need to maintain the quality of printed matter. In order to maintain such quality, a predetermined color chart is printed and the printed predetermined color chart is read using a colorimeter such as a scanner. Then, color adjustment needs to be executed for individual printing apparatuses according to the difference between the color of the printed predetermined color chart and the color of quality target. In view of the above, a method has been known in which, when there are a plurality of printing machines, a color chart including color patches used for color adjustment is prepared for each of the printing machines to execute color adjustment, a confirmation chart including color patches used for a check is printed after the execution of the color adjustment, and the confirmation chart is read using a colorimeter to confirm whether the printing machines satisfy a print quality standard.

In relation to a technique of executing color adjustment by printing a color chart including such color patches used for color adjustment, a technique is disclosed in which whether the in-plane unevenness of the colorimetric value of each of the color patches at the time the color chart is read is to be within a specified range. In the case where the in-plane unevenness of the colorimetric value of each of the color patches is determined not to be in the specified range, color adjustment is executed using the color chart in an image forming apparatus indicated by identification information included in the color chart.

SUMMARY

In one aspect, a computer-implemented method of creating color chart data to be used for executing color adjustment on an image forming apparatus includes obtaining, from a color chart printed out by the image forming apparatus, color chart data including a color adjustment patch group in which a plurality of color patches used for executing the color adjustment are arranged adjacent to each other, determining, for one or more of the plurality of color patches included in the color adjustment patch group, whether color of the color patch and color of an adjacent color patch adjacent to the color patch are similar, and based on a determination that the color of the color patch and the color of the adjacent color patch are similar, creating color chart data in which the color patch and the adjacent color patch that are similar in color are arranged not to be adjacent to each other.

In another aspect, an information processing apparatus for creating color chart data to be used for executing color adjustment for an image forming apparatus includes circuitry to obtain, from a color chart printed out by the image forming apparatus, color chart data including a color adjustment patch group in which a plurality of color patches used for executing the color adjustment are arranged adjacent to each other, determine, for one or more of the plurality of color patches included in the color adjustment patch group, whether color of the color patch and color of an adjacent color patch adjacent to the color patch are similar, and based on a determination that the color of the color patch and the adjacent color patch are similar, create color chart data in which the color patch and the adjacent color patch that are similar in color are arranged not to be adjacent to each other.

In another aspect, a color chart created by the method of creating color chart data describe above, in which the color patch and the adjacent color patch that are similar in color are arranged not to be adjacent to each other.

In another aspect, an image forming system includes the above-described information processing apparatus for creating color chart data, an image forming apparatus to print out a color chart based on the color chart data acquired from the information processing apparatus, and an image reading apparatus to read the color chart printed out by the image forming apparatus to generate color information data. The information processing apparatus for creating color chart data includes circuitry to obtain the color information data generated by the image reading apparatus, identify the image forming apparatus based on identification information included in the color information data, extract a colorimetric value of each of the plurality of color patches in the color adjustment patch group based on the color information data, and create, based on the colorimetric value of each of the plurality of color patches, a profile to be applied to the image forming apparatus.

In another aspect, a non-transitory recording medium storing a plurality of program codes which, when executed by one or more processors, causes the one or more processors to perform the method of creating color chart data includes obtaining, from a color chart printed out by the image forming apparatus, color chart data including a color adjustment patch group in which a plurality of color patches used for executing the color adjustment are arranged adjacent to each other, determining, for one or more of the plurality of color patches included in the color adjustment patch group, whether color of the color patch and color of an adjacent color patch adjacent to the color patch are similar, and based on a determination that the color of the color patch and the color of the adjacent color patch are similar, creating color chart data in which the color patch and the adjacent color patch that are similar in color are arranged not to be adjacent to each other.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
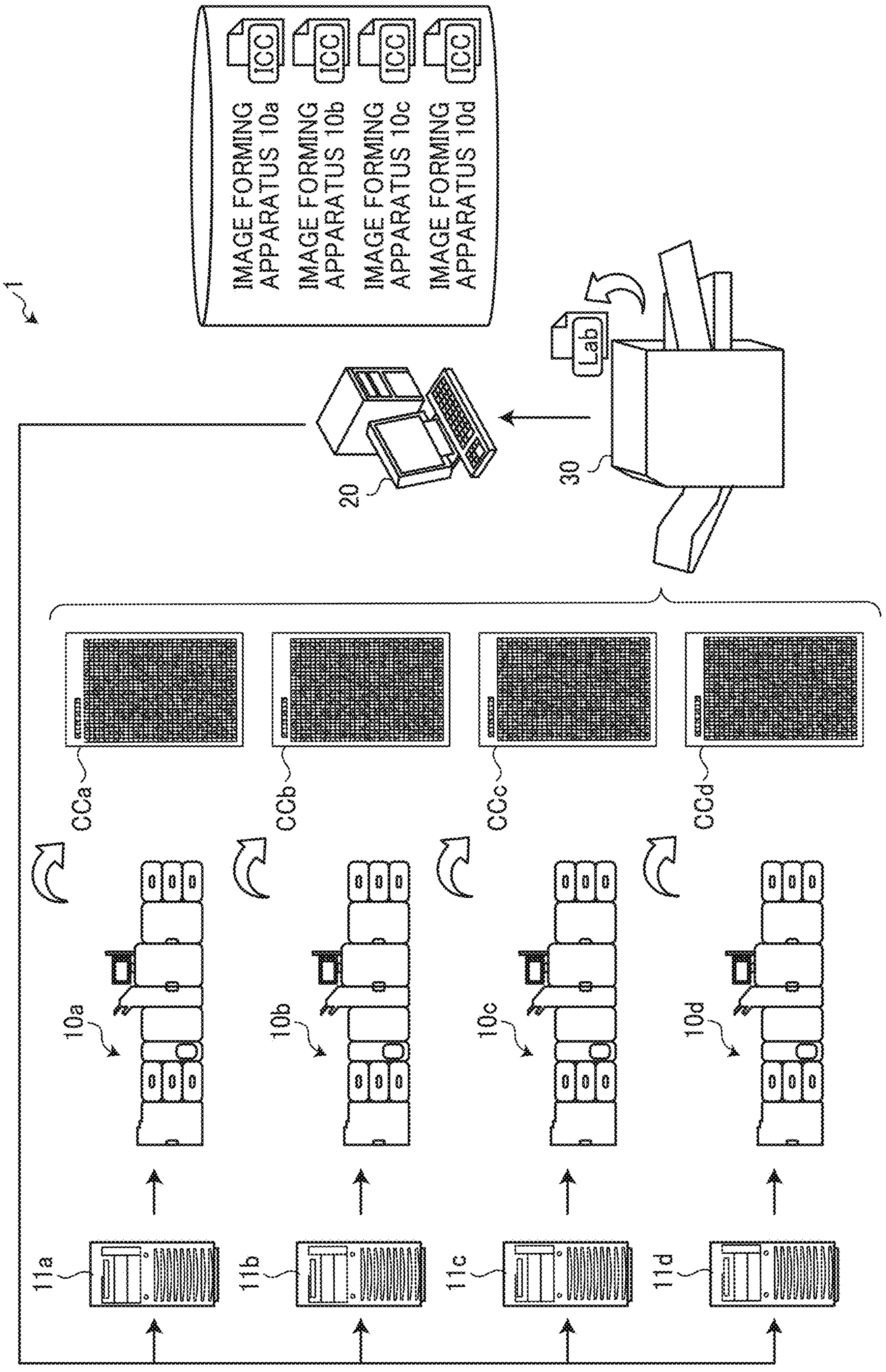
FIG. 1 is a schematic diagram illustrating an overall configuration of an image forming system according to the first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A method of creating color chart data, an information processing apparatus for creating color chart data, a color chart, an image forming system, and a carrier medium according to embodiments of the present disclosure are described in detail below with reference to the drawings. The present disclosure, however, is not limited to the following one or more embodiments, and the constituent elements of the following one or more embodiments include elements that may be easily conceived by those skilled in the art, those being substantially the same ones, and those being within equivalent ranges. Furthermore, various omissions, substitutions, changes, and combinations of the constituent elements may be made without departing from the gist of the following one or more embodiments.

First Embodiment

Overall Configuration of Image Forming System

FIG. 1 is a schematic diagram illustrating an overall configuration of an image forming system according to the first embodiment of the present disclosure. An overall configuration of an image forming system 1 according to the present embodiment is described below with reference to FIG. 1.

The image forming system 1 illustrated in FIG. 1 is an information processing system that efficiently enables color adjustment on a plurality of image forming apparatuses using a color chart. As illustrated in FIG. 1, the image forming system 1 includes image forming apparatuses 10*a* to 10*d*, digital front ends (DFEs) 11*a* to 11*d*, an information processing apparatus 20 that serves as a color chart data creation apparatus, and an image reading apparatus 30. Each apparatus or device included in the image forming system 1 performs data communication with each other via a network (for example, a network N illustrated in FIG. 4 described later).

The image forming apparatuses 10*a* to 10*d* are image forming apparatuses such as commercial printing apparatuses for which color adjustment processing is executed. As illustrated in FIG. 1, the image forming apparatuses 10*a* to 10*d* receive image data of a color chart (in the following description, sometimes referred to as color chart data) corresponding to each of the image forming apparatuses 10*a* to 10*d* held by the information processing apparatus 20, and print out color charts CCa to CCd to be used for color adjustment, respectively, based on the respective color chart data. A specific structure of the color chart will be described later with reference to FIG. 5.

In the present embodiment illustrated in FIG. 1, four image forming apparatuses 10*a* to 10*d* are illustrated as the image forming apparatuses. However, the number of the image forming apparatuses is not limited to any particular number, and may be any positive whole number. A plurality of image forming apparatuses (in the present embodiment, the image forming apparatuses 10*a* to 10*d* in FIG. 1) is referred to as image forming apparatuses 10 when the plurality of image forming apparatuses is referred to without distinction or collectively, and one thereof is referred to as an image forming apparatus 10. Similarly, the color charts printed out by the individual image forming apparatuses 10 (in the present embodiment, the adjustment color charts CCa to CCd in FIG. 1) are referred to as color charts CC when the color charts are referred to without distinction or collectively, and one thereof is referred to as a color chart CC.

The DFEs 11*a* to 11*d* are information processing apparatuses that execute predetermined image processing on print job data received from, for example, a personal computer (PC), and then issue print instructions to the image forming apparatuses 10*a* to 10*d*.

The image forming apparatuses 10*a* to 10*d* are described as commercial printing apparatuses that execute printing processing in response to the print instructions from the DFEs 11*a* to 11*d*. However, each of the image forming apparatuses 10*a* to 10*d* is not limited in particular, and may be any printing apparatus having a printing function as one of its primary functions such as an ordinary electrophotographic printing apparatus, an inkjet printing apparatus, or a multifunction peripheral (MFP). In the present embodiment, the MFP is a multifunction peripheral having at least two of a copying function, a printing function, a scanning function, and a facsimile communication function.

The information processing apparatus 20 is an information processing apparatus which generates color chart data to be printed out as an image by each image forming apparatus 10 such as a PC or a workstation. The information processing apparatus 20 transmits the generated color chart data to each image forming apparatus 10 when the color adjustment processing is executed for each image forming apparatus 10. The information processing apparatus 20 executes the color adjustment processing for each image forming apparatus 10 using image data obtained by the image reading apparatus 30 reading a color chart CC printed out by each image forming apparatus 10. The information processing apparatus 20 also creates an international color consortium (ICC) profile by executing color adjustment processing and transmits the ICC profile to the corresponding image forming apparatus 10 as a destination of the ICC profile to be applied. The corresponding image forming apparatus 10 executes print output using the ICC profile (in the following description, simply referred to as a profile). The apparatus to which the profile is applied may be another apparatus such as the DFE 11 or a print server in addition to the image forming apparatus 10. The information processing apparatus 20 may be a communication terminal such as a PC or a smartphone used by the operator, or may be a cloud server apparatus that provides functions as a cloud service.

The image reading apparatus 30 is an apparatus that executes reading processing on the color chart CC printed out by each image forming apparatus 10, and generates color information data obtained by converting the read value into a colorimetric value such as an L*a*b* value, an XYZ value, or an RGB value. The image reading apparatus 30 transmits the color information data including the generated colorimetric value to the information processing apparatus 20.

Examples of the image reading apparatus 30 include, but are not limited to, apparatuses such as an image scanner, a colorimeter, and an inline sensor disposed in a sheet conveyance path inside the image forming apparatus 10, and include any other apparatus having a function of obtaining color information data of the color chart. In the present embodiment, the colorimetric value (read value) based on the read value obtained by the image reading apparatus 30 executing the reading processing is an L*a*b* value (In the following description, simply referred to as a Lab value) of the L*a*b* colorimetric system. The read value read by the image reading apparatus 30 is not necessarily converted into the colorimetric value by the image reading apparatus 30. The image reading apparatus 30 may transmit the read value as raw data to the information processing apparatus 20, and the raw data may be converted into the colorimetric value by the information processing apparatus 20.

Hardware Configuration of Image Forming Apparatus

Figure 2:
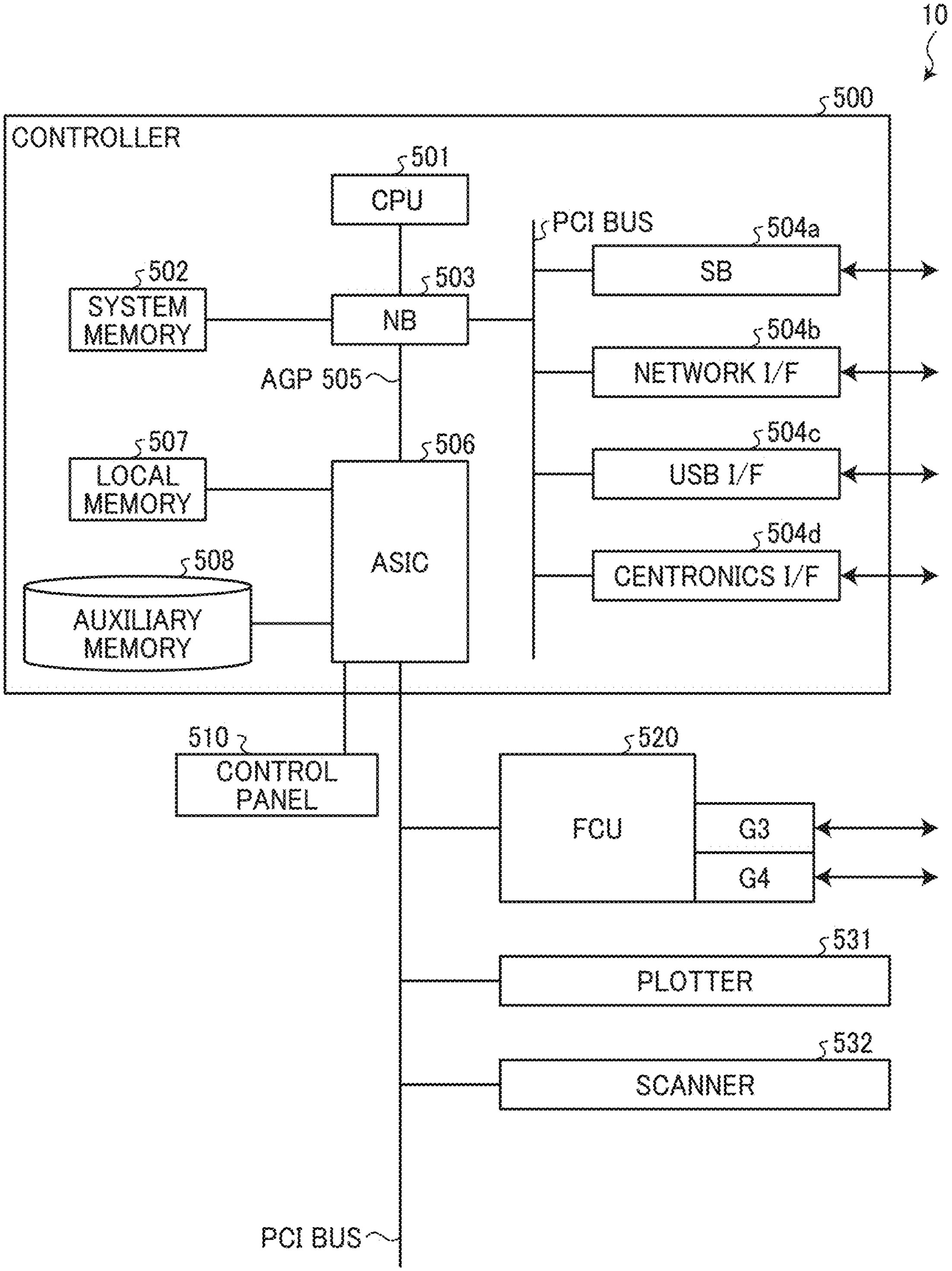
FIG. 2 is a block diagram illustrating a hardware configuration of an image forming apparatus according to the first embodiment of the present disclosure.

FIG. 2 is a block diagram illustrating a hardware configuration of an image forming apparatus according to the first embodiment of the present disclosure. A hardware configuration of the image forming apparatus 10 according to the present embodiment is described below with reference to FIG. 2. Although the hardware configuration is described on the assumption that the image forming apparatus 10 is an MFP in the present embodiment, this hardware configuration is applicable to any other types of printing apparatuses.

As illustrated in FIG. 2, the image forming apparatus 10 according to the present embodiment includes a controller 500, a control panel 510, a facsimile control unit (FCU) 520, a plotter 531 (printing apparatus), and a scanner 532, which are connected to each other via a peripheral component interconnect (PCI) bus.

The controller 500 is a device that controls the entire operation, drawing, and communication performed by the image forming apparatus 10 and controls input from the control panel 510.

The control panel 510 is, for example, a touch panel. The control panel 510 is a device that receives an input to the controller 500 (input function) and displays the status of the image forming apparatus 10 (display function). The control panel 510 is directly connected to an application-specific integrated circuit (ASIC) 506 described later.

The FCU 520 is a device that provides a facsimile communication function, and is connected to the ASIC 506 via, for example, the PCI bus.

The plotter 531 is a device that provides a printing function by forming an image on a recording medium such as a sheet, and is connected to the ASIC 506 via, for example, the PCI bus. The scanner 532 is a device that provides a scanning function, and is connected to the ASIC 506 via, for example, the PCI bus.

The controller 500 includes a central processing unit (CPU) 501, a system memory 502, a north bridge (NB) 503, a south bridge (SB) 504*a*, a network interface (I/F) 504*b*, a universal serial bus (USB) I/F 504*c*, a Centronics I/F 504*d*, the ASIC 506, a local memory 507, and an auxiliary memory 508.

The CPU 501 controls the entire operation of the image forming apparatus 10. The CPU 501 is connected to a chipset including the system memory 502, the NB 503, and the SB 504*a*, and is connected to other devices via the chipset.

The system memory 502 is a memory for storing programs and data, loading programs and data, and loading drawing data. The system memory 502 includes a read-only memory (ROM) and a random-access memory (RAM). The ROM is a read-only memory for storing programs and data. The RAM is a writable and readable memory for loading programs and data, and storing drawing data of the printer.

The NB 503 is a bridge for connecting the CPU 501 to the system memory 502, the SB 504*a*, and an accelerated graphics port (AGP) bus 505. The NB 503 includes a memory controller that controls the reading and writing from and to the system memory 502, a PCI master, and an AGP target.

The SB 504*a* is a bridge for connecting the NB 503 to PCI devices and peripheral devices. The SB 504*a* is connected to the NB 503 via the PCI bus. The network I/F 504*b*, the USB I/F 504*c*, and the Centronics I/F 504*d* are connected to the PCI bus.

The network I/F 504*b* is an interface for communicating data with an external apparatus such as the information processing apparatus 20 using the network N. The network I/F 504*b* supports, for example, ETHERNET and can make communication conforming to, for example, transmission control protocol (TCP)/Internet protocol (IP).

The USB I/F 504*c* is an interface that can communicate with devices conforming to the USB standard.

The Centronics I/F 504*d* is an interface having a specification of a parallel port that can transmit a plurality of bits.

The AGP bus 505 is a bus interface for a graphics accelerator card, which has been proposed to accelerate graphics processing. The AGP bus 505 directly accesses the system memory 502 with high throughput to accelerate the graphics accelerator card.

The ASIC 506 is an integrated circuit (IC) dedicated to image processing and includes hardware elements for image processing. The ASIC 506 serves as a bridge to connect the AGP bus 505, a PCI bus, the auxiliary memory 508, and the local memory 507 to each other. The ASIC 506 includes a PCI target, an AGP master, an arbiter (ARB) as a central processor of the ASIC 506, a memory controller to control the local memory 507, a plurality of direct memory access controllers (DMACs), and a PCI unit. For example, the DMACs convert coordinates of image data with hardware logic to rotate an image based on the image data. The PCI unit transfers data between the plotter 531 and the scanner 232 through the PCI bus. For example, the FCU 520, the plotter 531, and the scanner 532 are connected to the ASIC 506 via the PCI bus. The ASIC 506 is also connected to a host PC and a network.

The local memory 507 is a memory used as a buffer for image data to be copied or a code buffer.

The auxiliary memory 508 is a storage device such as a hard disk drive (HDD), a solid-state drive (SSD), a secure digital (SD) card, or a flash memory, and stores image data, programs, font data for printing, and form data.

Any computer program executed by the above-described image forming apparatus 10 may be provided, in a file format installable to or executable by a computer, as a computer program product stored in a computer-readable recording medium (for example, the auxiliary memory 508).

The hardware configuration of the image forming apparatus 10 illustrated in FIG. 2 is given by way of example. The image forming apparatus 10 does not necessarily include all the components illustrated in FIG. 2, or may include some other components.

Hardware Configuration of Information Processing Apparatus

Figure 3:
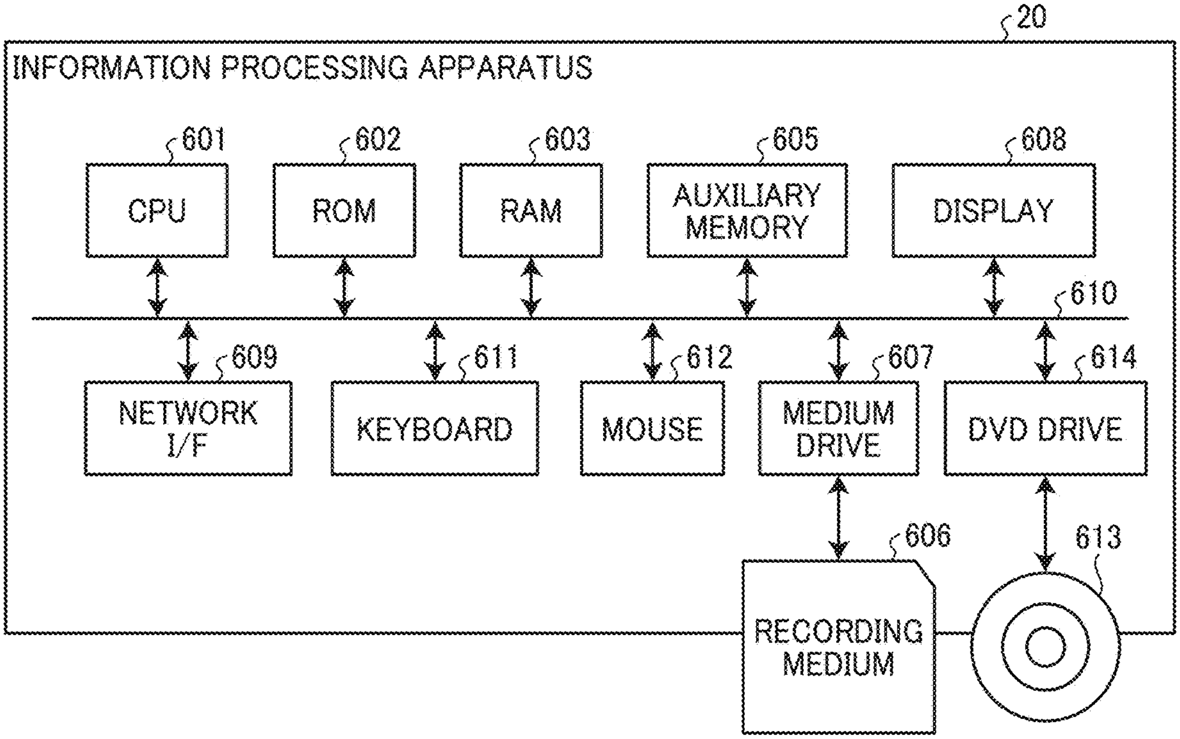
FIG. 3 is a block diagram illustrating a hardware configuration of an information processing apparatus according to the first embodiment of the present disclosure.

FIG. 3 is a block diagram illustrating a hardware configuration of an information processing apparatus according to the first embodiment of the present disclosure. A hardware configuration of the information processing apparatus 20 according to the present embodiment is described below with reference to FIG. 3. Although FIG. 3 is a block diagram illustrating the hardware configuration of an information processing apparatus 20, FIG. 3 may be considered to be a block diagram illustrating a hardware configuration of the DFE 11.

As illustrated in FIG. 3, the information processing apparatus 20 includes a CPU 601, a ROM 602, a RAM 603, an auxiliary memory 605, a medium drive 607, a display (display apparatus) 608, a network I/F 609, a keyboard 611, a mouse 612, and a digital versatile disc (DVD) drive 614.

The CPU 601 is a processor that controls the entire operation of the information processing apparatus 20. The ROM 602 is a nonvolatile storage device that stores programs for the information processing apparatus 20. The RAM 603 is a volatile storage device used as a work area for the CPU 601.

The auxiliary memory 605 is a storage device such as an HDD or an SSD that stores various data and programs. The medium drive 607 is a device that controls the reading and writing of data to and from a recording medium 606 such as a flash memory under the control of the CPU 601.

The display 608 is a display device that includes, for example, a liquid crystal display or an organic electroluminescence (EL) display on which various kinds of information such as a cursor, a menu, a window, characters, and images are displayed.

The network I/F 609 is an interface for communicating data with external apparatuses such as the image forming apparatus 10 and the image reading apparatus 30 using the network N. The network I/F 609 is, for example, a network interface card (NIC) that supports ETHERNET and can make communication conforming to, for example, TCP/IP.

The keyboard 611 is an input device used for selecting characters, numbers, or various instructions, and for moving a cursor, for example. The mouse 612 is an input device used for selecting and executing various instructions, selecting an object subjected to processing, and moving a cursor, for example.

The DVD drive 614 is a device that controls the reading and writing of various data from and to a DVD 613 that serves as a removable storage medium such as a digital versatile disc read-only memory (DVD-ROM) or a digital versatile disc recordable (DVD-R).

The CPU 601, the ROM 602, the RAM 603, the auxiliary memory 605, the medium drive 607, the display 608, the network I/F 609, the keyboard 611, the mouse 612, and the DVD drive 614 are communicably connected to each other via a bus line 610 such as an address bus or a data bus.

The hardware configuration of the information processing apparatus 20 illustrated in FIG. 3 is given by way of example. The information processing apparatus 20 does not necessarily include all the components illustrated in FIG. 3, or may include some other components.

Functional Configuration and Operation of Image Forming System

Figure 4:
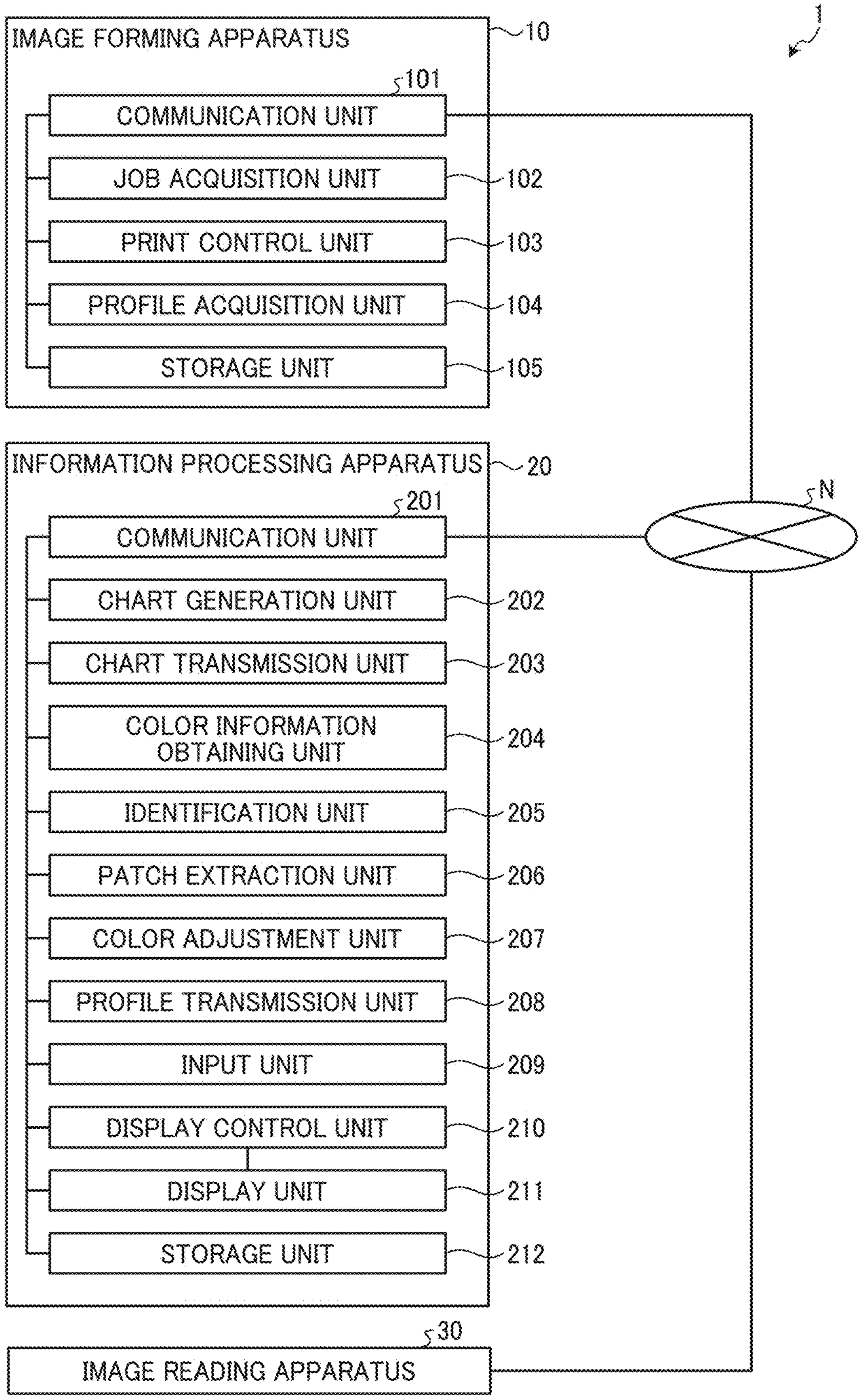
FIG. 4 is a block diagram illustrating a functional configuration of an image forming system according to the first embodiment of the present disclosure.
Figure 5:
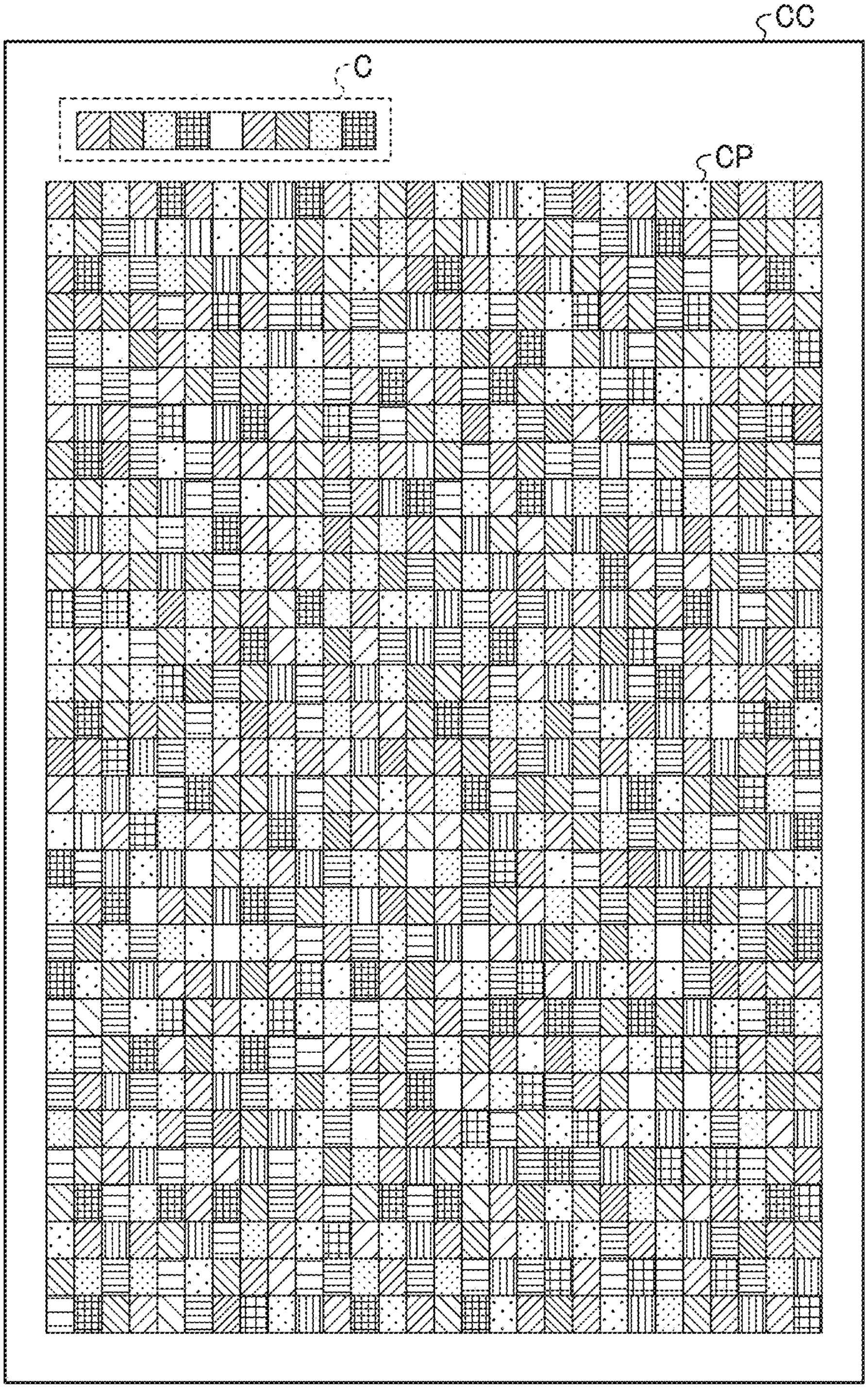
FIG. 5 is a diagram illustrating the structure of a color chart according to the first embodiment of the present disclosure.

FIG. 4 is a block diagram illustrating a functional configuration of an image forming system according to the first embodiment of the present disclosure. FIG. 5 is a diagram illustrating the structure of a color chart according to the first embodiment of the present disclosure. The functional configuration and operation of the image forming system 1 according to the present embodiment are described below with reference to FIGS. 4 and 5.

As illustrated in FIG. 4, the image forming apparatus 10 includes a communication unit 101, a job acquisition unit 102, a print control unit 103, a profile acquisition unit 104, and a storage unit 105.

The communication unit 101 is a functional unit that performs data communication with the information processing apparatus 20 via the network N. The communication unit 101 is implemented by the network I/F 504*b* and the CPU 501 illustrated in FIG. 2 executing a program.

The job acquisition unit 102 is a functional unit that acquires a print job of color chart data from the information processing apparatus 20 via the communication unit 101. The job acquisition unit 102 is implemented by, for example, the CPU 501 illustrated in FIG. 2 executing a program. The job acquisition unit 102 may be one of the functional units of the DFE 11. In this case, the information processing apparatus 20 transmits, for example, the print job of the color chart data and the print setting information to the DFE 11. The operator performs an operation of executing the print job of the color chart data on, for example, the operation screen of the DFE 11 to the image forming apparatus 10 at a desired timing.

The print control unit 103 is a functional unit that causes the plotter 531 to print out a color chart based on the print job of the color chart data acquired by the job acquisition unit 102. When the print control unit 103 causes the plotter 531 to print out the color chart, the print control unit 103 also causes the plotter 531 to print out a color code that includes identification information of the image forming apparatus 10, identification information of sheet type, date and time of the printing out, and identification information of the patch arrangement of the color chart. The identification information of the patch arrangement of the color chart identifies, for example, the number of rows and columns of color patches of the patch arrangement (a color adjustment patch group CP described later), the sizes of the color patches, and the size of the entire color chart CC. Since the identification information of the patch arrangement of the color chart serves as identification information for distinguishing the color chart from other color charts, the identification information of the patch arrangement of the color chart can also be regarded as identification information that indicates the sheet number of the color chart. The print control unit 103 is implemented by, for example, the CPU 501 illustrated in FIG. 2 executing a program.

A color chart CC illustrated in FIG. 5 is given by way of example as a color chart printed out under the control of the print control unit 103. As illustrated in FIG. 5, the color chart CC includes a color code C (that serves as identification information) and the color adjustment patch group CP.

As described above, the color code C is obtained by encoding, as color patches, the identification information of the image forming apparatus 10 that has printed out the color chart CC, the identification information of the sheet type on which the color chart CC has been printed, the date and time of the printing out, and the identification information of the arrangement of the color adjustment patch group CP. The color code C includes, for example, a combination of color patches of five colors such as cyan (C), magenta (M), yellow (Y), black (K), and white (W). At both ends of the color code C, color patches that indicate the ends of the color code C and specify the orientation of the color code C (the orientation of the arrangement of the color patches) are arranged. For example, as illustrated in FIG. 5, the arrangement of the two color patches on the left end of both ends is in the order of cyan (C) and magenta (M) from the left, and the arrangement of the two color patches on the right end is in the order of yellow (Y) and black (K) from the left. Since the colors of these four color patches are fixed and the arrangement thereof is also fixed, the orientation of the color code C can be specified by identifying the arrangement of these four color patches. The information of the color patches arranged at, for example, the left end or the right end of the color code C can be considered to be arrangement identification information for identifying, for example, the orientation and the arrangement of the color code C. The colors and the arrangement of the color patches of the arrangement identification information may be determined using other methods.

The color code C may include color patches of a mixture of these colors in addition to the above-described single colors of C, M, Y, K, and W, and is not limited to the above-described arrangement. The color code C may include other color patches in which coloring material of other colors is used, or may include color patches difficult to be seen, in which clear toner that is colorless and transparent or infrared (IR) toner that can be recognized by infrared irradiation is used.

The color patches arranged between each two color patches at both ends of the color code C indicate specifically encoded information (in the following description, sometimes referred to as color code information). Each of the color patches included in the color code C is arranged so that each of the color patches does not have the same color as the color patches adjacent to each of the color patches. To each color patch included in the color code information, an integer of numerical values from 0 to 4 is assigned, depending on the color of each color patch. The number of digits of the numerical value is determined by the number of color patches included in the color code information, and the color code information that is encoded can be digitized (decoded). The numerical value encoded from the color code information includes a numerical value part associated with the setting information and another numerical value part indicating the date and time. By referring to the setting information corresponding to the numerical value part associated with the setting information, the image forming apparatus 10 (e.g., a model, an IP address), the sheet type, and the patch arrangement of the color chart CC (arrangement of the color adjustment patch group CP) defined in the setting information are identified. The date and time when the color chart CC is printed out are directly identified by the other numerical value part indicating the date and time. Thus, the individual image forming apparatus 10 and the sheet type for which the information processing apparatus 20 executes the color adjustment processing are automatically identified by the information processing apparatus 20.

Although the identification information for identifying the image forming apparatus 10 that has printed out the color chart CC, the identification information for identifying the sheet type of the sheet on which the adjustment color chart CC is printed out, the date and time of the printing out of the color chart CC, and the identification information indicating the arrangement of the color adjustment patch group CP are encoded in the color code C, the encoded information is not limited thereto. For example, the color code C may also include identification information indicating print settings (for example, image density). In this case, specifically, the identification information indicating print settings may not be directly included in the color code information. The contents of the print settings may be included in the setting information corresponding to the part of the numerical value associated with the setting information. In the case where the date and time when the color code C is printed out is not necessarily managed, the content indicating the date and time may not be included in the color code information.

The color adjustment patch group CP is a color patch group used for the information processing apparatus 20 to execute color adjustment processing for the image forming apparatus 10 identified by the color code C. As will be described later, a patch extraction unit 206 of the information processing apparatus 20 specifies the position of the color adjustment patch group CP in the color chart CC based on the identification information of the color adjustment patch group CP included in the color code C, and extracts individual color patches from the specified color adjustment patch group CP. When extracting each of the color patches from the color adjustment patch group CP, the boundaries of each of the color patches need to be identified. However, when color patches of similar colors are arranged adjacent to each other, these color patches are difficult to extract (or identify). In view of the above, the information processing apparatus 20 according to the present embodiment generates, as described later, in order to facilitate extraction (identification) of each of the color patches included in the color adjustment patch group CP included in the color chart CC, data of the color chart CC so that color patches of similar colors are arranged not to be adjacent to each other. A method of generating the data of the color chart CC (color chart data) is described in detail with reference to FIG. 6 described later.

The arrangement of the color patches of the color adjustment patch group CP in the color chart CC illustrated in FIG. 5 is given by way of example. The arrangement, the colors, and the number of the color patches are not limited to those illustrated in FIG. 5, as long as the arrangement satisfies Formulas 1 and 2 described later.

Referring back to FIG. 4, the description of the functional configuration continues. The profile acquisition unit 104 is a functional unit that acquires, via the communication unit 101, a profile created by the information processing apparatus 20 executing the color adjustment processing using the colorimetric value (Lab value) of the color chart CC. The profile acquisition unit 104 stores the acquired profile in the storage unit 105. The profile stored in the storage unit 105 is applied to the control of print output onto a sheet executed by the print control unit 103. The profile acquisition unit 104 is implemented by, for example, the CPU 501 illustrated in FIG. 2 executing a program.

The profile is created and transmitted by the information processing apparatus 20 for an individual model of the image forming apparatus 10 indicated by the color code and for an individual sheet type used in the individual model. Then, the profile is acquired by, stored in, and applied to the image forming apparatus 10 (or the DFE 11). In this case, profiles for a plurality of sheet types may be stored in one image forming apparatus 10. When a print job is executed, one of the profiles may be selected and used for an individual print job of a different sheet type before the execution of the print job. For example, when the print job received by the image forming apparatus 10 includes information specifying a specific sheet type or information specifying a specific sheet feeding tray, the profile to be used may be changed before the execution of the print job in accordance with the information. In updating a profile, each time a profile used for a specific sheet type is transmitted to one image forming apparatus 10, only the profile for the sheet type corresponding to the read color code may be updated and stored, and the profiles for the other sheet types may not be updated. Alternatively, only one profile may be stored in one image forming apparatus 10. In this case, in order to execute printing on a sheet of a different sheet type, a profile corresponding to the different sheet type may be newly created, and the profile newly created is updated by the one image forming apparatus 10.

The storage unit 105 is a functional unit that stores, for example, the profile acquired by the profile acquisition unit 104, various data, and programs. The storage unit 105 is implemented by the auxiliary memory 508 illustrated in FIG. 2.

Of the functional units of the image forming apparatus 10 illustrated in FIG. 4, at least a part of the functional units implemented by software (a program) may be implemented by a hardware circuit such as a field-programmable gate array (FPGA) or an ASIC.

Further, each functional unit of the image forming apparatus 10 illustrated in FIG. 4 is a conceptual representation of a function, and the functional configuration of the image forming apparatus 10 is not limited thereto. For example, two or more of the functional units of the image forming apparatus 10 illustrated in FIG. 4 as independent units may be integrated into a single functional unit. By contrast, a plurality of functions provided by one functional unit of the image forming apparatus 10 illustrated in FIG. 4 may be divided and allocated to a plurality of functional units.

As illustrated in FIG. 4, the information processing apparatus 20 includes a communication unit 201, a chart generation unit 202 (generation device), a chart transmission unit 203, a color information obtaining unit 204 (obtaining device), an identification unit 205, a patch extraction unit 206 (extraction device), a color adjustment unit 207, a profile transmission unit 208, an input unit 209, a display control unit 210, a display unit 211, and a storage unit 212. The chart generation unit 202 serves as a "determination device" and a "replacement device" in the present disclosure.

The communication unit 201 is a functional unit that performs data communication with the image forming apparatus 10 and the image reading apparatus 30 via the network N. The communication unit 201 is implemented by the network I/F 609 and the CPU 601 illustrated in FIG. 3 executing a program.

The chart generation unit 202 is a functional unit that generates data of the color chart CC (color chart data) illustrated in FIG. 5. A method of generating the data of the color chart CC (color chart data) is described in detail with reference to FIG. 6 described later. The chart generation unit 202 is implemented by, for example, the CPU 601 illustrated in FIG. 3 executing a program.

The chart transmission unit 203 is a functional unit that transmits, via the communication unit 201, a print job of the color chart data generated by the chart generation unit 202 to the image forming apparatus 10 in order for the image forming apparatus 10 to print out the color chart CC. The chart transmission unit 203 is implemented by, for example, the CPU 601 illustrated in FIG. 3 executing a program.

The color information obtaining unit 204 is a functional unit that obtains, from the image reading apparatus 30 via the communication unit 201, color information data including a colorimetric value (Lab value) of each color patch of the color chart CC obtained by the image reading apparatus 30 executing reading processing on the color chart CC printed out by the image forming apparatus 10. The color information obtaining unit 204 is implemented by, for example, the CPU 601 illustrated in FIG. 3 executing a program.

The identification unit 205 is a functional unit that identifies color code information of the color code C from the color information data of the color chart CC obtained by the color information obtaining unit 204, digitizes (decodes) the color code information of the color code C, and identifies the image forming apparatus 10 (e.g., a model), the sheet type, the patch arrangement of the color chart CC (the patch arrangement of the color adjustment patch group CP), and the date and time of the printing out. The identification unit 205 is implemented by, for example, the CPU 601 illustrated in FIG. 3 executing a program.

The patch extraction unit 206 is a functional unit that identifies each of the color patches in the color adjustment patch group CP in the color information data obtained by the color information obtaining unit 204 and extracts a colorimetric value of each of the color patches. The method of identifying each of the color patches in the color adjustment patch group CP by the patch extraction unit 206 is described in detail with reference to FIGS. 9 to 11, which will be described later. The patch extraction unit 206 is implemented by, for example, the CPU 601 illustrated in FIG. 3 executing a program.

The color adjustment unit 207 is a functional unit that executes color adjustment processing using the colorimetric value of each of the color patches corresponding to the color adjustment patch group CP extracted by the patch extraction unit 206. Specifically, since the color value of each color patch in the color chart data of the color chart CC is known in advance, the color adjustment unit 207 creates a profile by executing color adjustment processing of a known technique to approximate the colorimetric value of each of the color patches corresponding to the color adjustment patch group CP to the color value of each color patch in the color chart data of the color chart CC. The color adjustment unit 207 is implemented by, for example, the CPU 601 illustrated in FIG. 3 executing a program.

The profile transmission unit 208 is a functional unit that transmits the profile created by the color adjustment unit 207 to the image forming apparatus 10 identified by the identification unit 205 via the communication unit 201. The profile transmission unit 208 is implemented by, for example, the CPU 601 illustrated in FIG. 3 executing a program.

The input unit 209 is a functional unit that receives an input operated by the operator. The input unit 209 is implemented by the keyboard 611 and the mouse 612 illustrated in FIG. 3.

The display control unit 210 is a functional unit that controls the display unit 211 to display various screens and information. The display control unit 210 is implemented by, for example, the CPU 601 illustrated in FIG. 3 executing a program.

The display unit 211 is a functional unit that displays the various screens and the information under the control of the display control unit 210. The display unit 211 is implemented by the display 608 illustrated in FIG. 3.

The storage unit 212 is a functional unit that stores, for example, the color chart data and the profile created by the color adjustment unit 207. The storage unit 212 is implemented by the auxiliary memory 605 illustrated in FIG. 3.

Of the functional units of the information processing apparatus 20 illustrated in FIG. 4, at least a part of the functional units implemented by software (a program) may be implemented by a hardware circuit such as an FPGA or an ASIC.

Further, each functional unit of the information processing apparatus 20 illustrated in FIG. 4 is a conceptual representation of a function, and the functional configuration of the information processing apparatus 20 is not limited thereto. For example, two or more of the functional units of the information processing apparatus 20 illustrated as independent units in FIG. 4 may be integrated into a single functional unit. By contrast, a plurality of functions provided by one functional unit of the information processing apparatus 20 illustrated in FIG. 4 may be divided and allocated to a plurality of functional units.

Processing to Generate Color Chart Data

Figure 6:
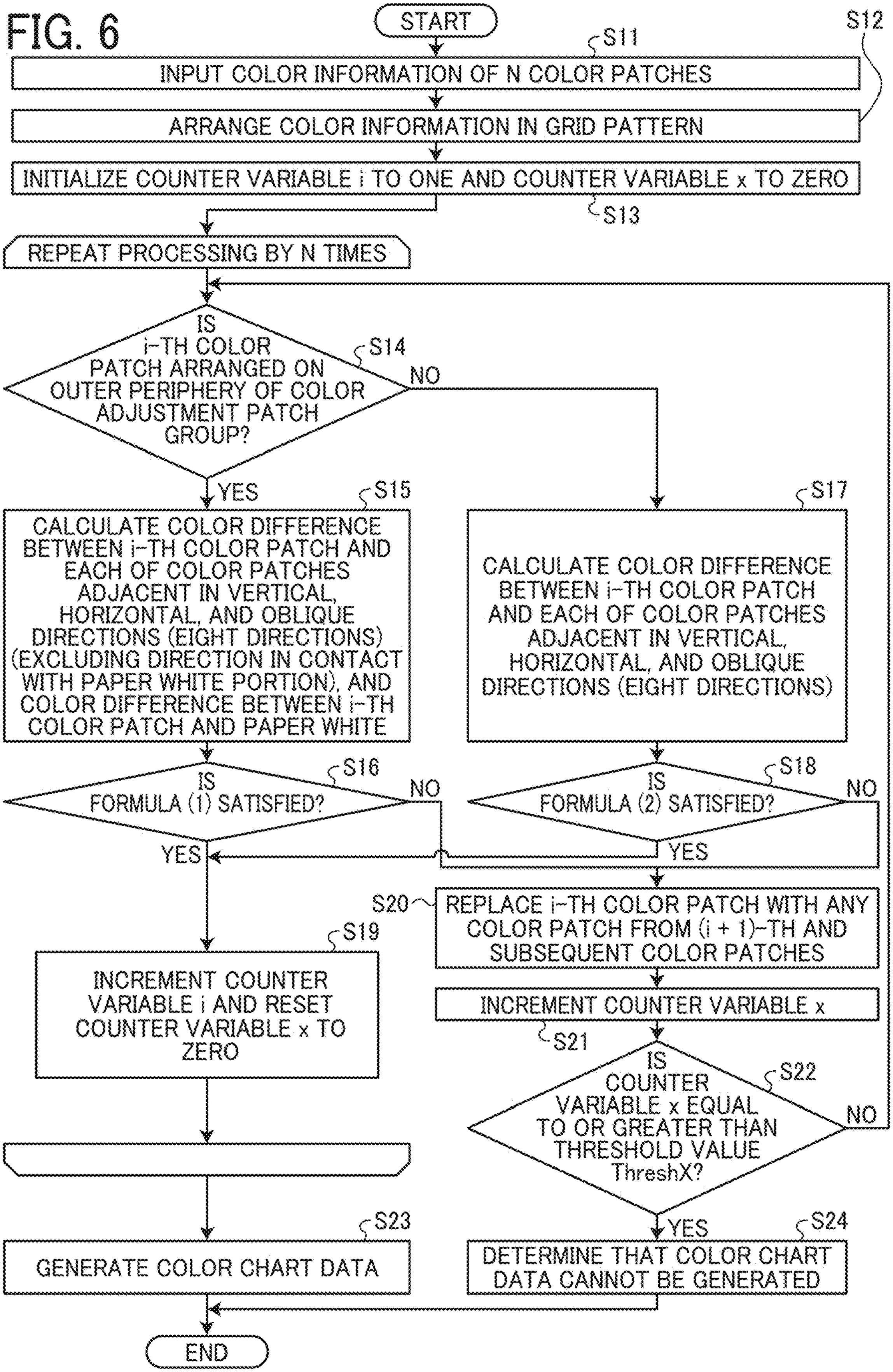
FIG. 6 is a flowchart of the processing to generate color chart data executed by an information processing apparatus, according to the first embodiment of the present disclosure.
Figure 7:
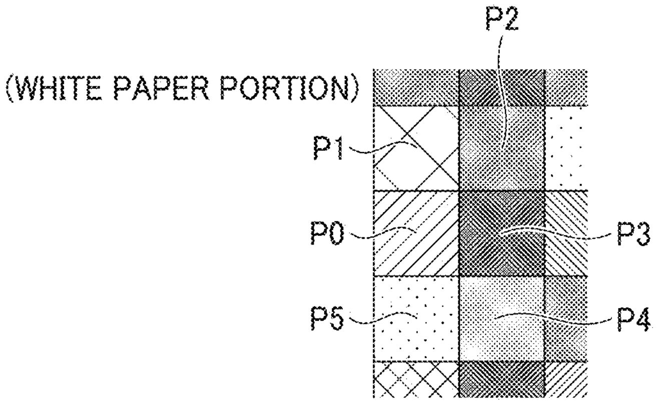
FIG. 7 is a diagram illustrating the relative positions of color patches arranged on an outer periphery of a color adjustment patch group, which are used for threshold value determination executed in the processing to generate color chart data executed by an information processing apparatus, according to the first embodiment of the present disclosure.
Figure 8:
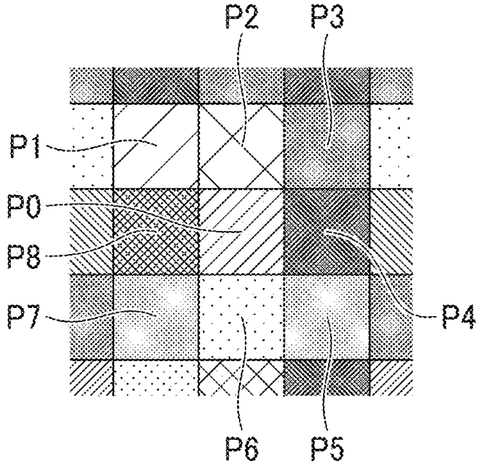
FIG. 8 is a diagram illustrating the relative positions of color patches not arranged on an outer periphery of a color adjustment patch group, which are used for threshold value determination executed in the processing to generate color chart data executed by an information processing apparatus, according to the first embodiment of the present disclosure.

FIG. 6 is a flowchart of the processing to generate color chart data executed by an information processing apparatus, according to the first embodiment of the present disclosure. FIG. 7 is a diagram illustrating the relative positions of color patches arranged on an outer periphery of a color adjustment patch group, which are used for threshold value determination executed in the processing to generate color chart data executed by an information processing apparatus, according to the first embodiment of the present disclosure. FIG. 8 is a diagram illustrating the relative positions of color patches not arranged on an outer periphery of a color adjustment patch group, which are used for threshold value determination executed in the processing to generate color chart data executed by an information processing apparatus, according to the first embodiment of the present disclosure. The processing to generate color chart data executed by the information processing apparatus 20 according to the present embodiment is described below with reference to FIGS. 6 to 8.

Step S11

The operator inputs color information of N color patches to be used for the color adjustment patch group CP of the color chart CC through the input unit 209 of the information processing apparatus 20. For example, the method of inputting the color information of N color patches may be a method of selecting one set from a plurality of sets of color information of N color patches determined in advance, a method of randomly generating N pieces of color information, or a method of generating N pieces of color information, which are individually designated by the operator. Then, the processing proceeds to step S12.

Step S12

The chart generation unit 202 of the information processing apparatus 20 arranges the color information of the N color patches inputted by the operator in a grid pattern like the color adjustment patch group CP of the color chart CC illustrated in FIG. 5. Although the arrangement of the color information of the N color patches at this stage is tentative, the arrangement of the color patches (color information) arranged in such a grid pattern is referred to as the color adjustment patch group CP in the present embodiment. Then, the processing proceeds to step S13.

Step S13

The chart generation unit 202 initializes a counter variable i for counting N times to one. As will be described later, the chart generation unit 202 also initializes a counter variable x for counting the number of times the i-th color patch is replaced with any color patch from the (i+1)-th color patch and subsequent color patches to zero. In the present embodiment, the i-th indicates, for example, the order in the case where raster scanning is executed on the color adjustment patch group CP in which the color information of the color patches is arranged in a grid pattern. Then, the processing proceeds to step S14.

Step S14

The chart generation unit 202 determines whether the i-th color patch is arranged on the outer periphery of the color adjustment patch group CP. In the case where the i-th color patch is determined to be arranged on the outer periphery of the color adjustment patch group CP (YES in step S14), the processing proceeds to step S15. In the case where the i-th color patch is determined not to be arranged on the outer periphery of the color adjustment patch group CP (i.e., in the case where the i-th color patch is arranged inside the color adjustment patch group CP) (NO in step S14), the processing proceeds to step S17.

Step S15

The chart generation unit 202 calculates a color difference (the first color difference) between the i-th color patch arranged on the outer periphery of the color adjustment patch group CP and each of the color patches adjacent in the vertical, horizontal, and oblique directions (excluding the direction in contact with the paper white portion), and a color difference (the second color difference) between the i-th color patch and the paper white (color of paper). As the color difference, for example, ΔE2000 that has a high affinity with human senses may be used, or ΔE76 or ΔE94 that is easy to calculate may be used. Specifically, as illustrated in FIG. 7, assuming that a patch P0 that is a colorimetric target is the i-th color patch arranged on the outer periphery of the color adjustment patch group CP, the chart generation unit 202 calculates color differences $E_1$ to $E_5$ between the patch P0 and patches P1 to P5 and a color difference $E_E$ between the patch P0 and the paper white.

In the present embodiment, when the chart generation unit 202 calculates the color differences using the adjacent color patches, the color patches adjacent in the vertical, horizontal, and oblique directions are used to calculate the color differences. However, the adjacent color patches are not limited thereto. For example, the color patches adjacent in the vertical and horizontal directions may be used to calculate the color differences.

Then, the processing proceeds to step S16.

Step S16

The chart generation unit 202 determines whether all of the calculated color differences $E_1$ to $E_5$ and $E_E$ are equal to or greater than a predetermined threshold value ThreshE, that is, whether a formula 1 given below is satisfied. In the formula 1, the threshold value for the color difference between the color patches and the color difference between the color patch and the paper white are both set as the threshold value ThreshE. However, the threshold value for the color difference between the color patch and the paper white may be another threshold value different from the threshold value ThreshE.

$$\begin{cases} E_1 \geqq ThreshE \\ E_2 \geqq ThreshE \\ \quad \cdots \\ E_5 \geqq ThreshE \\ E_E \geqq ThreshE \end{cases} \qquad \text{Formula 1}$$

In the case where the formula (1) is determined to be satisfied (YES in step S16), the processing proceeds to step S19. In the case where the formula (1) is determined not to be satisfied (NO in step S16), the processing proceeds to step S20.

Step S17

The chart generation unit 202 calculates a color difference (the first color difference) between the i-th color patch not arranged on the outer periphery of the color adjustment patch group CP and each of the color patches adjacent in the vertical, horizontal, and oblique directions. As the color difference, for example, ΔE2000 that has a high affinity with human senses may be used, or ΔE76 or ΔE94 that is easy to calculate may be used. Specifically, as illustrated in FIG. 8, assuming that the patch P0 that is a colorimetric target is the i-th color patch arranged inside the color adjustment patch group CP, the chart generation unit 202 calculates color differences $E_1$ to $E_8$ between the patch P0 and patches P1 to P8.

In the present embodiment, when the chart generation unit 202 calculates the color differences using the adjacent color patches, the color patches adjacent in the vertical, horizontal, and oblique directions are used to calculate the color differences. However, the adjacent color patches are not limited thereto. For example, the color patches adjacent in the vertical and horizontal directions may be used to calculate the color differences.

Then, the processing proceeds to step S18.

Step S18

The chart generation unit 202 determines whether all of the calculated color differences $E_1$ to $E_8$ are equal to or greater than the predetermined threshold value ThreshE, that is, whether a formula 2 given below is satisfied.

$$\begin{cases} E_1 \geqq ThreshE \\ E_2 \geqq ThreshE \\ \quad \cdots \\ E_8 \geqq ThreshE \end{cases} \qquad \text{Formula 2}$$

In the case where the formula 2 is determined to be satisfied (YES in step S18), the processing proceeds to step S19. In the case where the formula 2 is determined not to be satisfied (NO in step S18), the processing proceeds to step S20.

Step S19

In the case where the formula 1 is determined to be satisfied in step S16 or in the case where the formula 2 is determined to be satisfied in step S18, the chart generation unit 202 determines the i-th color patch to be a formal color patch to be arranged in the color adjustment patch group CP. The chart generation unit 202 increments the counter variable i and resets the counter variable x to zero.

Step S20

In the case where the formula 1 is determined not to be satisfied in step S16 or in the case where the formula 2 is determined not to be satisfied in step S18, the chart generation unit 202 determines that the i-th color patch is not suitable as a formal color patch because the color differences between the current i-th color patch and the color patches adjacent to the current i-th color patch are not equal to or greater than the predetermined threshold value ThreshE (that is, the current i-th color patch and the color patches adjacent to the current i-th color patch both have similar colors). In this case, the chart generation unit 202 replaces the current i-th color patch with any color patch from the (i+1)-th color patch and subsequent color patches in the color patch group, as the new i-th color patch. When the i-th color patch is replaced, the color patch to replace the i-th color patch is not limited to a color patch selected from the (i+1)-th color patch and subsequent color patches in the color patch group. For example, the i-th color patch may be replaced with color information of any color patch selected from the N color patches input in step S11, or may be replaced with color information other than the color information of the N color patches input in step S11. Then, the processing proceeds to step S21.

Step S21

The chart generation unit 202 increments the counter variable x. Then, the processing proceeds to step S22.

Step S22

The chart generation unit 202 determines whether the counter variable x is equal to or greater than a predetermined threshold value ThreshX. In the case where the counter variable x is determined to be equal to or greater than the threshold value ThreshX (YES in step S22), the processing proceeds to step S24. In the case where the counter variable x is determined to be smaller than the threshold value ThreshX (NO in step S22), the processing returns to step S14.

Since "i" is an integer from one to N, the processing of steps S14 to S22 described above is repeatedly executed for N color patches, that is, N times. After the N times of execution, the processing proceeds to step S23.

Step S23

After the N color patches are determined for the color adjustment patch group CP, the chart generation unit 202 generates color chart data of the color chart CC based on the color information of the determined color patches. Thus, the color chart data is generated in a manner that the color difference between each of the color patches in the color adjustment patch group CP and the color patch adjacent to each of the color patches and the color difference between each of the color patches in the color adjustment patch group CP and the paper white are equal to or greater than the predetermined threshold value, that is, in a manner that the boundary between the color patches adjacent to each other is identifiable. Then, the processing to generate color chart data ends.

Step S24

In the case where the counter variable x is determined to be equal to or greater than the threshold value ThreshX in step S22, the chart generation unit 202 determines that the generation of the color chart data of the color chart CC is not executable. Then, the processing to generate color chart data ends.

Color Adjustment Processing

Figure 9:
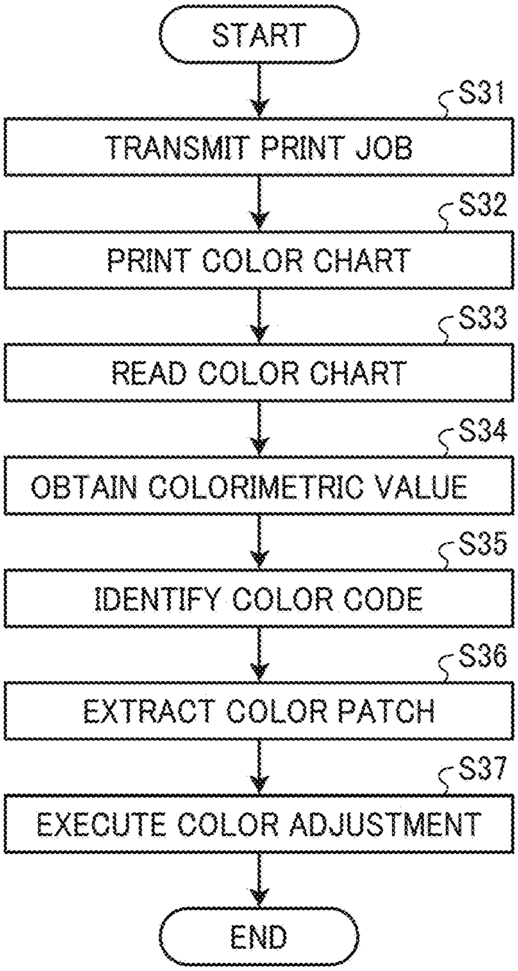
FIG. 9 is a flowchart of the color adjustment processing executed by an image forming system, according to the first embodiment of the present disclosure.
Figure 10:
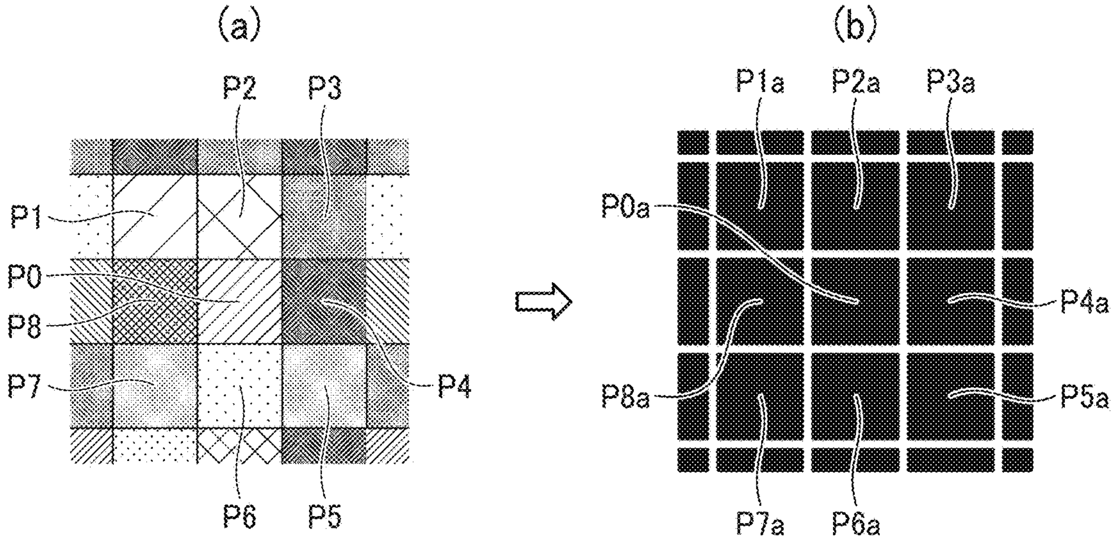
FIG. 10 is a diagram illustrating data obtained by applying a Sobel filter to color information data in color adjustment processing executed by an image forming system, according to the first embodiment of the present disclosure.
Figure 11:
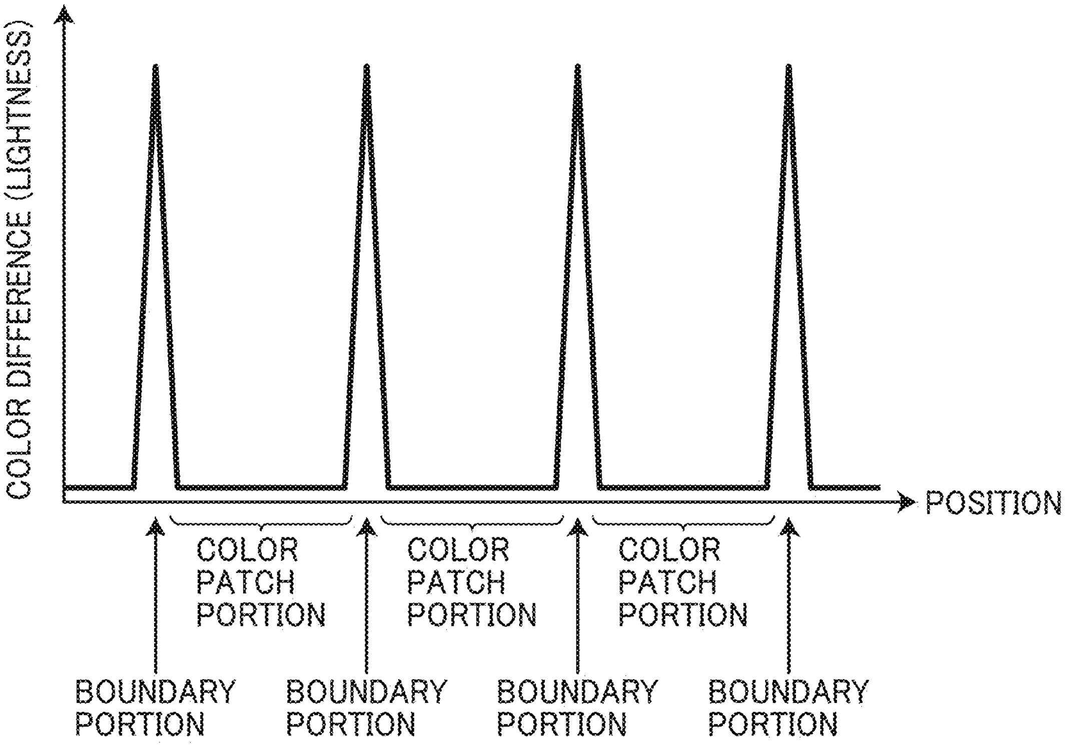
FIG. 11 is a graph illustrating a color difference in a predetermined direction of data obtained by applying a Sobel filter to color information data in color adjustment processing executed by an image forming system, according to the first embodiment of the present disclosure.

FIG. 9 is a flowchart of the color adjustment processing executed by an image forming system, according to the first embodiment of the present disclosure. FIG. 10 is a diagram illustrating data obtained by applying a Sobel filter to color information data in color adjustment processing executed by an image forming system, according to the first embodiment of the present disclosure. FIG. 11 is a graph illustrating a color difference in a predetermined direction of data obtained by applying a Sobel filter to color information data in color adjustment processing executed by an image forming system, according to the first embodiment of the present disclosure. The color adjustment processing executed by the image forming system 1 according to the present embodiment is described below with reference to FIGS. 9 to 11.

Step S31

The chart transmission unit 203 of the information processing apparatus 20 transmits, via the communication unit 201, a print job of a piece of color chart data among the pieces of color chart data generated by the chart generation unit 202 to one of the image forming apparatuses 10, for which the color adjustment processing is to be executed. Based on the print job of the piece of color chart data, one of the image forming apparatuses 10 that has received the print job prints out the color chart CC. In this case, the chart transmission unit 203 may transmit a print job of the piece of color chart data to the image forming apparatuses 10. Then, the processing proceeds to step S32.

Step S32

The job acquisition unit 102 of one of the image forming apparatuses 10 that has received the print job acquires the print job of the piece of color chart data from the information processing apparatus 20. The print control unit 103 of one of the image forming apparatuses 10 that has received the print job causes the plotter 531 to print out the color chart CC based on the print job of the piece of color chart data acquired by the job acquisition unit 102. In this case, when causing the plotter 531 to print out the color chart CC, the print control unit 103 also causes the plotter 531 to print out the color code C that includes the identification information of one of the image forming apparatuses 10 that has received the print job, the identification information of the sheet type, the date and time of the printing out, and the identification information of the patch arrangement of the color chart CC. The structure of the color chart CC is as described above. Then, the processing proceeds to step S33.

Step S33

The image reading apparatus 30 executes reading processing on the color chart CC printed out by one of the image forming apparatuses 10 that has received the print job, and generates color information data by converting the read value of the entire face of the color chart CC into a colorimetric value (Lab value). The image reading apparatus 30 transmits the generated color information data to the information processing apparatus 20. Then, the processing proceeds to step S34.

Alternatively, the image reading apparatus 30 may continuously read a plurality of color charts CC collectively placed, on each of which a color code including, for example, identification information corresponding to one of a plurality of different image forming apparatuses 10 and identification information of sheet types are printed. Then, the image reading apparatus 30 transmits the color information data obtained by reading the color charts CC to the information processing apparatus 20 sequentially or all at once.

Step S34

The color information obtaining unit 204 of the information processing apparatus 20 obtains color information data corresponding to the color chart CC printed out by one of the image forming apparatuses 10 that has received the print job from the image reading apparatus 30 via the communication unit 201. Then, the processing proceeds to step S35.

Step S35

In order to identify the color code C from the color information data of the color chart CC obtained by the color information obtaining unit 204, the identification unit 205 of the information processing apparatus 20 scans the color information data from the leading edge and searches for the color patches at both ends of the color code C.

For example, the identification unit 205 specifies the color code information of the color chart CC by identifying that the two color patches arranged at the left end of both ends of the color code C are color patches of cyan (C) and magenta (M) in order from the left, and the two color patches arranged at the right end of both ends of the color code C are color patches of yellow (Y) and black (K) in order from the left. On the other hand, in the case where the color chart CC is upside down, the identification unit 205 recognizes that the color chart CC is upside down by identifying that the two color patches arranged at the left end of both ends of the color code C are color patches of black (K) and yellow (Y) in order from the left, and the two color patches arranged at the right end of both ends of the color code C are color patches of magenta (M) and cyan (C) in order from the left. In this case, the identification unit 205 performs a process of rotating, by 180 degrees, the color information data of the entire face of the color chart CC obtained when the color chart CC is read upside down so that the color patches are arranged when the color chart CC is read in the standard reading direction. By adding this process, the identification unit 205 can still appropriately execute processing on the color information data of the color chart CC read in different directions, and specifies the color code information of the color chart CC.

Then, the identification unit 205 digitizes (decodes) the specified color code information to identify, for example, one of the image forming apparatuses 10 that has received the print job (e.g., a model), the sheet type, the patch arrangement of the color chart CC (arrangement of the color adjustment patch group CP), and the date and time of the printing out. Then, the processing proceeds to step S36.

Step S36

The patch extraction unit 206 of the information processing apparatus 20 identifies each of the color patches in the color adjustment patch group CP included in the color information data obtained by the color information obtaining unit 204, and extracts the colorimetric value of each of the color patches. In this case, specifically, the patch extraction unit 206 first executes processing on the color information data using a filter (for example, a Sobel filter) that emphasizes the boundaries between each of the color patches in the color adjustment patch group CP. As described above, since the color chart data printed out in step S32 is generated in such a manner that the color difference between each of the color patches in the color adjustment patch group CP and the color patch adjacent to each of the color patches and the color difference between each of the color patches in the color adjustment patch group CP and the paper white are equal to or greater than the predetermined threshold value, the boundaries of each of the color patches obtained after the execution of the filter processing are remarkably emphasized. For example, when the filter processing is executed on the color adjustment patch group CP (the color patch P0 that is a colorimetric target and the color patches P1 to P8) of the color information data illustrated in part (a) of FIG. 10, image data that includes color patches P0*a* to P8*a*, in which the boundaries between the color patches are remarkably emphasized, is obtained as illustrated in part (b) of FIG. 10. In the image data illustrated in part (b) of FIG. 10, portions where the variation of the color difference is large are presented in white, and portions where the variation of the color difference is small are presented in black.

The patch extraction unit 206 detects color variations (color differences) in the x direction (horizontal direction) and the y direction (vertical direction) of the image data obtained by executing the filter processing on the color information data, and identifies the boundaries of each of the color patches in the color adjustment patch group CP based on the peaks of the color variations. For example, in FIG. 11, a graph of the color difference in the vertical direction of the image data obtained after the execution of the filter processing is presented. Specifically, the pixel value (lightness) of the image data obtained after the execution of the filter processing indicates the color difference. The patch extraction unit 206 identifies the boundaries of each of the color patches by capturing the peaks of the graph of the color difference (lightness) illustrated in FIG. 11. As described above, since the color chart data is generated in such a manner that the color difference between each of the color patches in the color adjustment patch group CP and the color patch adjacent to each of the color patches and the color difference between each of the color patches in the color adjustment patch group CP and the paper white are equal to or greater than the predetermined threshold value, the boundaries of each of the color patches in the image data obtained after the execution of the filter processing are easily identified. The patch extraction unit 206 extracts each of the color patches by identifying the boundaries of each of the color patches in the color adjustment patch group CP of the color information data. Then, the processing proceeds to step S37.

Step S37

The color adjustment unit 207 of the information processing apparatus 20 executes color adjustment processing using the colorimetric value of each of the color patches corresponding to the color adjustment patch group CP extracted by the patch extraction unit 206. Specifically, since the color value of each color patch in the color chart data of the color chart CC is known in advance, the color adjustment unit 207 creates a profile by executing color adjustment processing of a known technique to approximate the colorimetric value of each of the color patches corresponding to the color adjustment patch group CP to the color value of each color patch in the color chart data of the color chart CC. The profile transmission unit 208 of the information processing apparatus 20 transmits the profile created by the color adjustment unit 207 to the image forming apparatus 10 identified by the identification unit 205 via the communication unit 201. When a plurality of color charts CC on which color codes including, for example, identification information of a plurality of different image forming apparatuses 10 and identification information of sheet types are printed are collectively read, a plurality of profiles to be applied to the image forming apparatuses 10 and sheet types are created. The profiles are stored in the information processing apparatus 20 for each of the image forming apparatuses 10 and each of the sheet types using the identification information, and the profiles are transmitted to the image forming apparatuses 10 using the identification information.

The profile acquisition unit 104 of the image forming apparatus 10 acquires the profile created by the information processing apparatus 20 via the communication unit 101. The profile acquisition unit 104 stores the acquired profile in the storage unit 105. The profile stored in the storage unit 105 is applied to the control of print output onto a sheet executed by the print control unit 103. Then, the color adjustment processing ends.

As described above, the color chart CC generated by the image forming system 1 according to the present embodiment is a color chart used for executing color adjustment on the image forming apparatus 10. The color chart CC includes the color code C and the color adjustment patch group CP. The color code C indicates the image forming apparatus 10 for which the color adjustment is executed. The color adjustment patch group CP includes a plurality of color patches arranged adjacent to each other, which is used for executing the color adjustment on the image forming apparatus 10 indicated by the color code C. Each of the color patches included in the color adjustment patch group CP is arranged so that the boundary between each of the color patches and a color patch adjacent to each of the color patches is identifiable. Specifically, for example, in the color chart CC, each of the color patches included in the color adjustment patch group CP is arranged so that the color difference between each of the color patches and the color patch adjacent to each of the color patches becomes equal to or greater than the predetermined threshold value. Thus, a color chart in which each of the color patches to be used for the color adjustment is easily identified is obtained.

In the color chart CC according to the present embodiment, the identification information of the image forming apparatus 10, the identification information of the sheet type, the date and time of the printing out, and the identification information of the patch arrangement of the color chart CC are included in the color code, but these pieces of information are not necessarily included in the color code. For example, these pieces of information may be included in a bar code or a two-dimensional code, and the bar code or the two-dimensional code is printed out on the color chart CC together with the color adjustment patch group CP.

Second Embodiment

The image forming system 1 according to the second embodiment is described below, focusing on the differences from the image forming system 1 according to the first embodiment. In the first embodiment, the operation of the information processing apparatus 20 to generate color chart data in which color patches are arranged in a manner that the color difference between color patches adjacent to each other is equal to or greater than the predetermined threshold value is described. In the present embodiment, the operation of the information processing apparatus 20 to generate color chart data in which a boundary line having a color corresponding to the color difference between color patches adjacent to each other is arranged at the boundary between the color patches adjacent to each other is described. The overall configuration of the image forming system 1, the hardware configurations of the image forming apparatus 10 and the information processing apparatus 20, and the functional configuration of the image forming system 1, according to the present embodiment are substantially the same as those described in the first embodiment.

Color Chart

Figure 12:
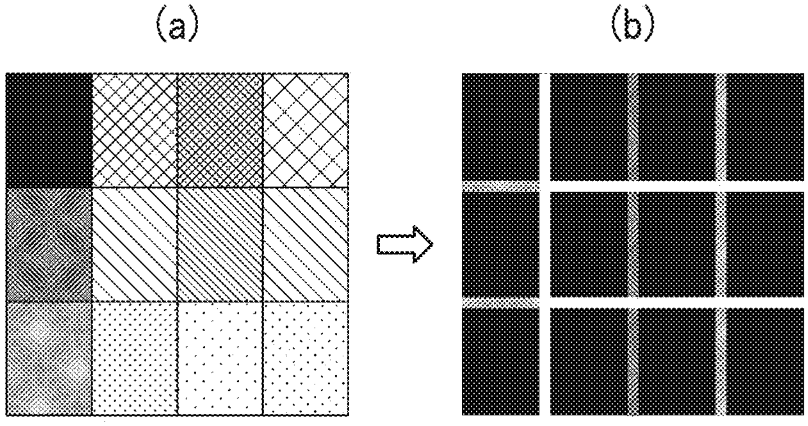
FIG. 12 is a diagram illustrating data obtained by applying a Sobel filter to a color adjustment patch group whose color patches have color values close to each other, according to an embodiment of the present disclosure.
Figure 13:
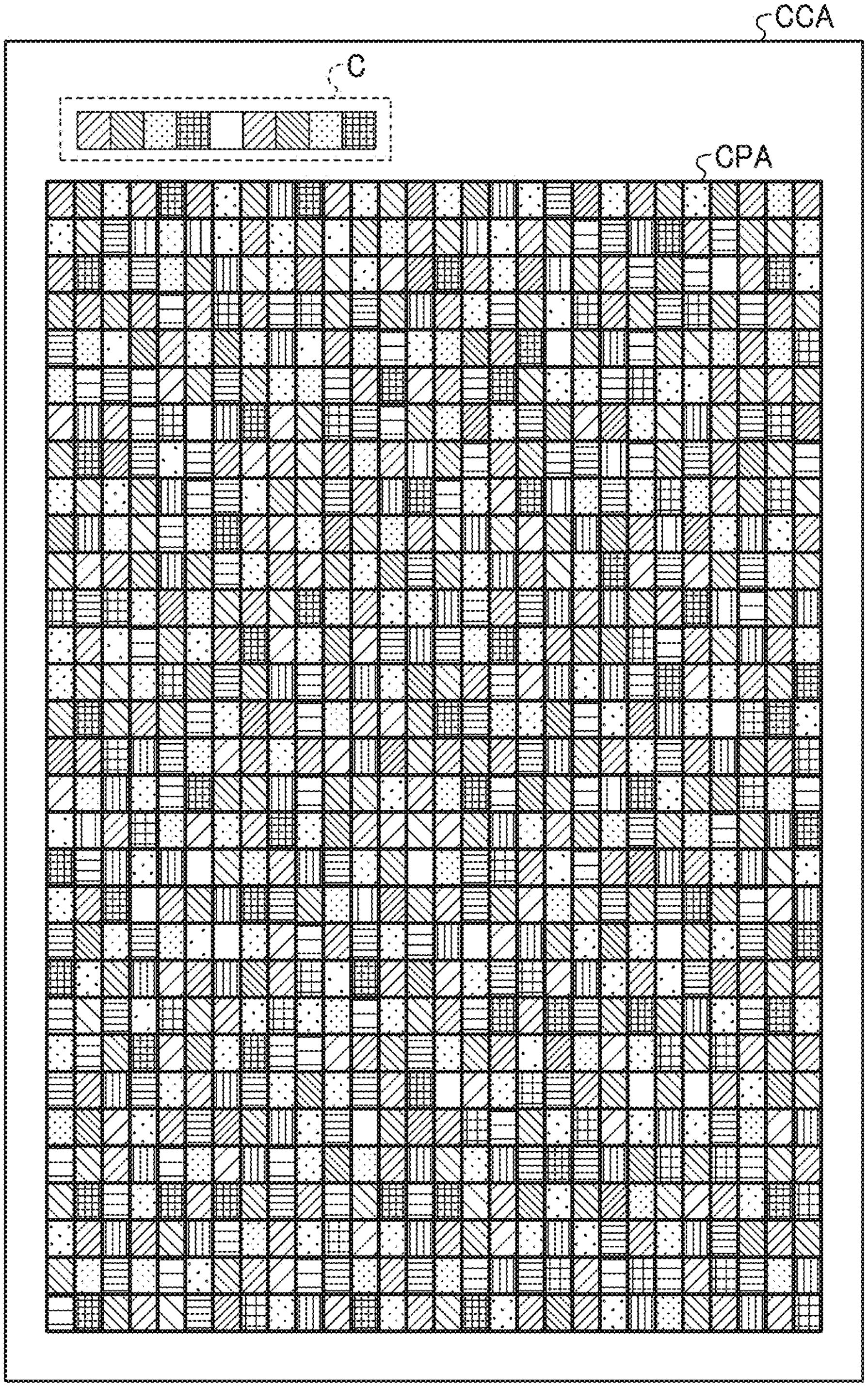
FIG. 13 is a diagram illustrating the structure of a color chart according to the second embodiment of the present disclosure.

FIG. 12 is a diagram illustrating data obtained by applying a Sobel filter to a color adjustment patch group whose color patches have color values close to each other, according to an embodiment of the present disclosure. FIG. 13 is a diagram illustrating the structure of a color chart according to the second embodiment of the present disclosure. A color chart according to the present embodiment is described below with reference to FIGS. 12 and 13.

In the first embodiment described above, the color patches cannot be necessarily arranged in a manner that the color difference between color patches adjacent to each other is equal to or greater than the predetermined threshold value, depending on the processing of determination in step S22 of FIG. 6. In some cases, the generation of the color chart data is not executable as in step S24. However, if each of the color patches in the color adjustment patch group CP is randomly arranged, color patches having similar colors with small color differences may be arranged adjacent to each other as illustrated in part (a) of FIG. 12. In this case, it is difficult for the patch extraction unit 206 to identify the boundaries of each of the color patches and extract each of the color patches. In view of the above, as illustrated in part (b) of FIG. 12, the chart generation unit 202 of the information processing apparatus 20 according to the present embodiment generates color chart data in which a boundary line having a color corresponding to the average lightness of color patches adjacent to each other is arranged at the boundary of the color patches adjacent to each other. Thus, the boundary between the color patches adjacent to each other is easily identified.

A color chart CCA illustrated in FIG. 13 is given by way of example as a color chart printed out under the control of the print control unit 103. As illustrated in FIG. 13, the color chart CCA includes the color code C and a color adjustment patch group CPA. The color code C is as described above with reference to FIG. 5.

The color adjustment patch group CPA is a color patch group used for the information processing apparatus 20 to execute color adjustment processing for the image forming apparatus 10 identified by the color code C. The color adjustment patch group CPA is different from the color adjustment patch group CP of the color chart CC according to the first embodiment described above in that a boundary line having a color according to the average lightness of color patches adjacent to each other is printed out at the boundary of the color patches adjacent to each other. A method of generating the color chart data of the color chart CCA is described in detail with reference to FIG. 14 described later.

Processing to Generate Color Chart Data

Figure 14:
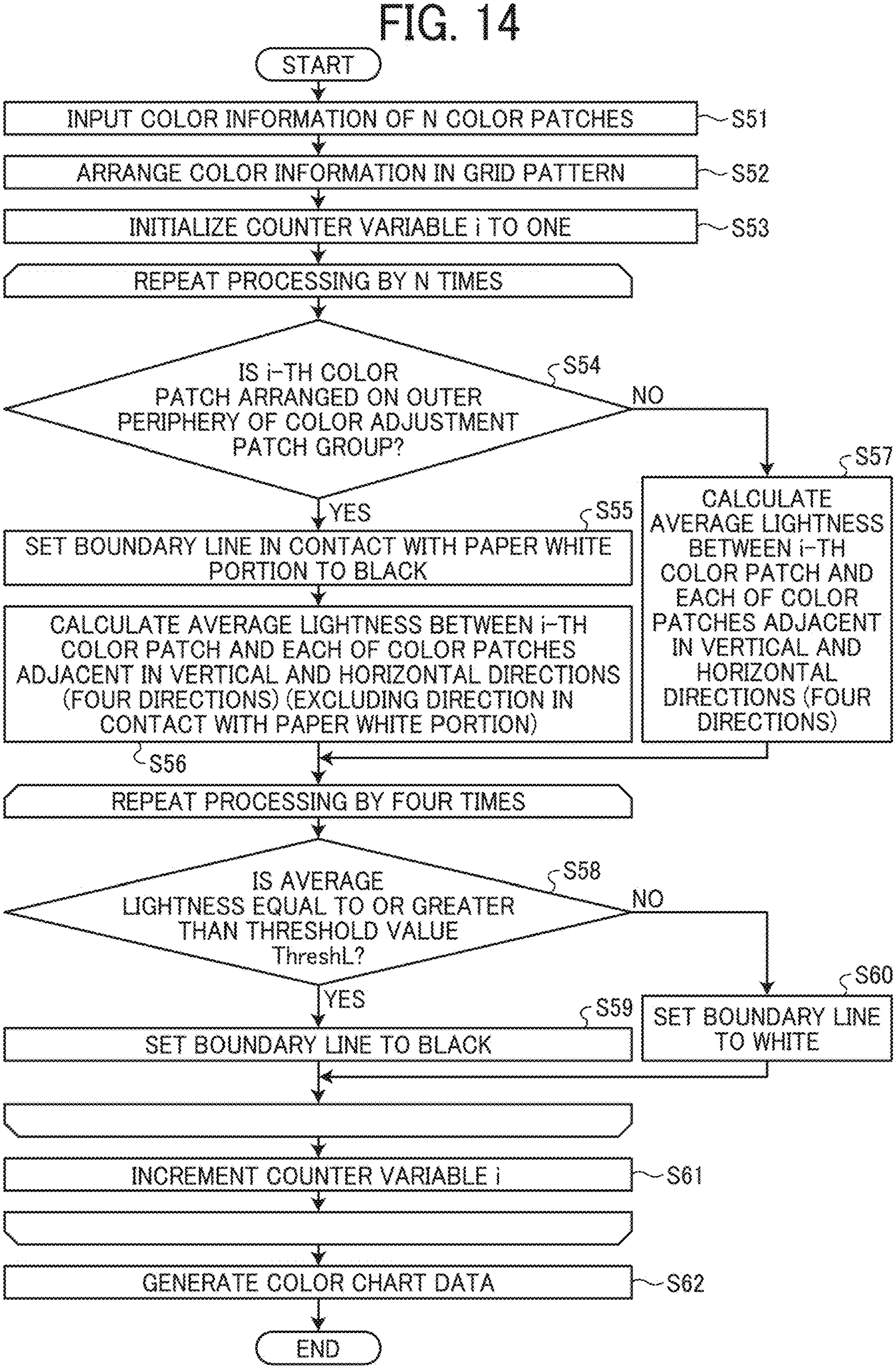
FIG. 14 is a flowchart of the processing to generate color chart data executed by an information processing apparatus, according to the second embodiment of the present disclosure.

FIG. 14 is a flowchart of the processing to generate color chart data executed by an information processing apparatus, according to the second embodiment of the present disclosure. The processing to generate color chart data executed by the information processing apparatus 20 according to the present embodiment is described below with reference to FIG. 14.

Step S51

The operator inputs color information of N color patches to be used for the color adjustment patch group CPA of the color chart CCA through the input unit 209 of the information processing apparatus 20. For example, the method of inputting the color information of N color patches may be a method of selecting one set from a plurality of sets of color information of N color patches determined in advance, a method of randomly generating N pieces of color information, or a method of generating N pieces of color information, which are individually designated by the operator. Then, the processing proceeds to step S52.

Step S52

The chart generation unit 202 of the information processing apparatus 20 arranges the color information of the N color patches inputted by the operator in a grid pattern like the color adjustment patch group CPA of the color chart CCA illustrated in FIG. 13. Then, the processing proceeds to step S53.

Step S53

The chart generation unit 202 initializes the counter variable i for counting N times to one. In the present embodiment, the i-th indicates, for example, the order in the case where raster scanning is executed on the color adjustment patch group CPA in which the color information of the color patches is arranged in a grid pattern. Then, the processing proceeds to step S54.

Step S54

The chart generation unit 202 determines whether the i-th color patch is arranged on the outer periphery of the color adjustment patch group CPA. In the case where the i-th color patch is determined to be arranged on the outer periphery of the color adjustment patch group CPA (YES in step S54), the processing proceeds to step S55. In the case where the i-th color patch is determined not to be arranged on the outer periphery of the color adjustment patch group CPA (i.e., in the case where the i-th color patch is arranged inside the color adjustment patch group CPA) (NO in step S54), the processing proceeds to step S57.

Step S55

The chart generation unit 202 sets the boundary lines between the paper white portion and the i-th color patch arranged on the outer periphery of the color adjustment patch group CPA to black. Then, the processing proceeds to step S56.

Step S56

The chart generation unit 202 calculates the average lightness of the i-th color patch arranged on the outer periphery of the color adjustment patch group CPA and the color patches adjacent to the i-th color patch in the vertical and horizontal directions (excluding the direction in contact with the white paper portion). Then, the processing proceeds to step S58.

Step S57

The chart generation unit 202 calculates the average lightness of the i-th color patch not arranged on the outer periphery of the color adjustment patch group CPA and the color patches adjacent to the i-th color patch in the vertical and horizontal directions. Then, the processing proceeds to step S58.

Step S58

The chart generation unit 202 determines whether the average lightness of the i-th color patch and a color patch adjacent to the i-th color patch at the boundary in a specific direction is equal to or greater than a predetermined threshold value ThreshL. In the case where the average lightness is determined to be equal to or greater than the predetermined threshold value ThreshL (YES in step S58), the processing proceeds to step S59. In the case where the average lightness is determined to be smaller than the predetermined threshold value ThreshL (NO in step S58), the processing proceeds to step S60.

Step S59

In the case where the average lightness of the i-th color patch and the color patch adjacent to the i-th color patch at the boundary in the specific direction is determined to be equal to or greater than the predetermined threshold ThreshL, the chart generation unit 202 sets the boundary line between the i-th color patch and the color patch adjacent to the i-th color patch in the specific direction to black. In this way, color patches adjacent to each other whose average lightness is high can be separated by a black boundary line having the lowest lightness. The chart generation unit 202 serves as an "arrangement device to arrange a black boundary line" in the present disclosure.

Step S60

In the case where the average lightness of the i-th color patch and the color patch adjacent to the i-th color patch at the boundary in the specific direction is determined to be smaller than the predetermined threshold ThreshL, the chart generation unit 202 sets the boundary line between the i-th color patch and the color patch adjacent to the i-th color patch in the specific direction to white. In this way, color patches adjacent to each other whose average lightness is low can be separated by a white boundary line having the highest lightness. The chart generation unit 202 serves as an "arrangement device to arrange a white boundary line" in the present disclosure.

The processing of steps S58 to S60 described above is repeatedly executed for the boundaries of four sides of the i-th color patch, that is, four times. After the four times of execution, the processing proceeds to step S61.

Step S61

The chart generation unit 202 increments the counter variable i.

Since "i" is an integer from one to N, the processing of steps S54 to S61 described above is repeatedly executed for N color patches, that is, N times. After the N times of execution, the processing proceeds to step S62.

Step S62

After setting the color of the boundary line of each boundary of the N color patches for the color adjustment patch group CPA, the chart generation unit 202 generates color chart data of the color chart CCA. Thus, color chart data is generated, which is used for printing boundary lines that clearly indicate the boundary between each of the color patches in the color adjustment patch group CPA and a color patch adjacent to each of the color patches and the boundary between each of the color patches in the color adjustment patch group CPA and the paper white portion. In other words, the color chart data is generated in a manner that the boundary between the color patches adjacent to each other is identifiable. Then, the processing to generate color chart data ends.

The lightness of each color patch is used to set the color of the boundary line between color patches adjacent to each other, but the information to be used to set the color of the boundary line is not limited to the lightness. For example, the color of the boundary line may be set using other information on the color such as a color difference. In other words, a color boundary line based on each of the color patches in the color adjustment patch group CPA and a color patch adjacent to each of the color patches may be arranged.

As described above, in the color chart CCA generated in the image forming system 1 according to the present embodiment, the color adjustment patch group CPA includes the color boundary line based on each of the color patches in the color adjustment patch group CPA and a color patch adjacent to each of the color patches arranged at the boundary between each of the color patches in the color adjustment patch group CPA and the color patch adjacent to each of the color patches. More specifically, for example, the color chart data of the color chart CCA is generated in a manner according to the following cases after the determination of whether the average lightness of each of the color patches in the color adjustment patch group CPA and a color patch adjacent to each of the color patches is equal to or greater than the predetermined threshold value. In the case where the average lightness is determined to be equal to or greater than the predetermined threshold value, the color chart data of the color chart CCA is generated in a manner that a black boundary line is arranged at the boundary between each of the color patches in the color adjustment patch group CPA and the color patch adjacent to each of the color patches. In the case where the average lightness is determined to be smaller than the predetermined threshold value, the color chart data of the color chart CCA is generated in a manner that a white boundary line is arranged at the boundary between each of the color patches in the color adjustment patch group CPA and the color patch adjacent to each of the color patches. Thus, a color chart in which each of the color patches to be used for the color adjustment is easily identified is obtained.

Modification

Figure 15:
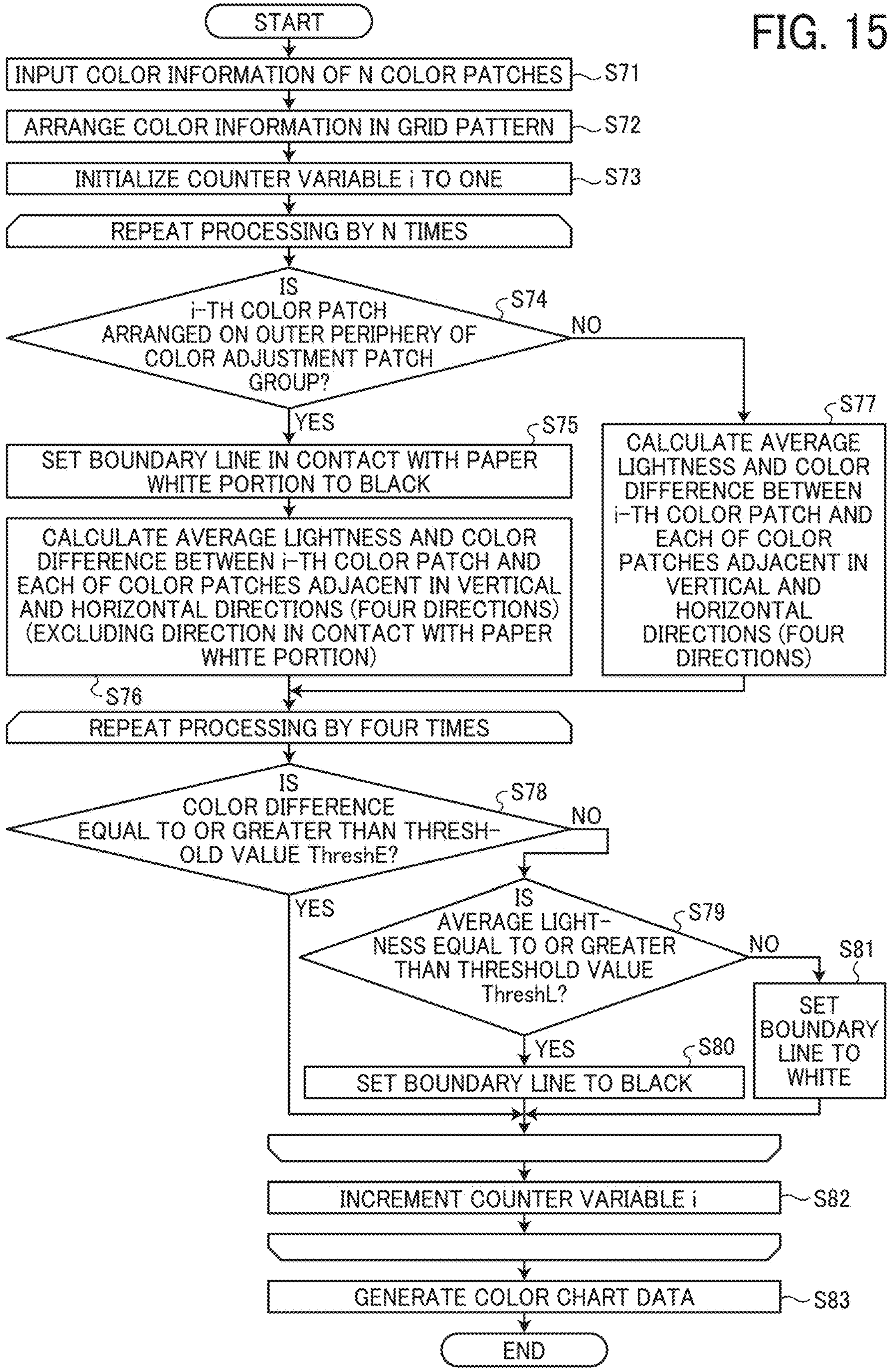
FIG. 15 is a flowchart of the processing to generate color chart data executed by an information processing apparatus, according to a modification of the second embodiment of the present disclosure.

FIG. 15 is a flowchart of the processing to generate color chart data executed by an information processing apparatus, according to a modification of the second embodiment of the present disclosure. The processing to generate color chart data executed by the information processing apparatus 20 according to the present modification is described below with reference to FIG. 15.

The purpose of printing the boundary lines in the second embodiment is to clarify the boundaries between the color patches. For this reason, in the present modification, in the case where the color difference between the color patches is determined to be equal to or greater than the predetermined threshold value in advance, the boundary line is not printed at the boundary. The operation is described below.

Steps S71 to S75

The processing of steps S71 to S75 is the same as the processing of steps S51 to S55 illustrated in FIG. 14 described above.

Step S76

The chart generation unit 202 calculates an average lightness and a color difference between the i-th color patch arranged on the outer periphery of the color adjustment patch group CPA and each of the color patches adjacent to the i-th color patch in the vertical and horizontal directions (excluding the direction in contact with the white paper portion). Then, the processing proceeds to step S78.

Step S77

The chart generation unit 202 calculates an average lightness and a color difference between the i-th color patch not arranged on the outer periphery of the color adjustment patch group CPA and each of the color patches adjacent to the i-th color patch in the vertical and horizontal directions. Then, the processing proceeds to step S78.

Step S78

The chart generation unit 202 determines whether the color difference between the i-th color patch and a color patch adjacent to the i-th color patch at the boundary in a specific direction is equal to or greater than the predetermined threshold value ThreshE. In the case where the color difference is determined to be equal to or greater than the predetermined ThreshE (YES in step S78), the processing of step S78 is executed again to determine whether the color difference between the i-th color patch and the color patch adjacent to the i-th color patch at the boundary in another direction different from the specific direction is equal to or greater than the predetermined threshold value ThreshE. On the other hand, in the case where the color difference is determined to be smaller than the predetermined threshold value ThreshE NO in step S78), the processing proceeds to step S79.

Step S79

The chart generation unit 202 determines whether the average lightness of the i-th color patch and the color patch adjacent to the i-th color patch at the boundary in the same direction as the specific direction for which the processing of determination in step S78 is executed is equal to or greater than the predetermined threshold value ThreshL. In the case where the average lightness is determined to be equal to or greater than the predetermined threshold value ThreshL (YES in step S79), the processing proceeds to step S80. In the case where the average lightness is determined to be smaller than the predetermined threshold value ThreshL (NO in step S79), the processing proceeds to step S81.

Step S80

In the case where the average lightness of the i-th color patch and the color patch adjacent to the i-th color patch at the boundary in the specific direction is determined to be equal to or greater than the predetermined threshold ThreshL, the chart generation unit 202 sets the boundary line between the i-th color patch and the color patch adjacent to the i-th color patch in the specific direction to black. In this way, color patches adjacent to each other whose average lightness is high can be separated by a black boundary line having the lowest lightness.

Step S81

In the case where the average lightness of the i-th color patch and the color patch adjacent to the i-th color patch at the boundary in the specific direction is determined to be smaller than the predetermined threshold ThreshL, the chart generation unit 202 sets the boundary line between the i-th color patch and the color patch adjacent to the i-th color patch in the specific direction to white. In this way, color patches adjacent to each other whose average lightness is low can be separated by a white boundary line having the highest lightness.

The processing of steps S78 to S81 described above is repeatedly executed for the boundaries of four sides of the i-th color patch, that is, four times. After the four times of execution, the processing proceeds to step S82.

Step S82

The chart generation unit 202 increments the counter variable i.

Since "i" is an integer from one to N, the processing of steps S74 to S82 described above is repeatedly executed for N color patches, that is, N times. After the N times of execution, the processing proceeds to step S83.

Step S83

After the processing for N color patches in the color adjustment patch group CPA is completed, the chart generation unit 202 generates color chart data of the color chart CCA. Thus, color chart data in which the boundary between each of the color patches in the color adjustment patch group CPA and a color patch adjacent to each of the color patches and the boundary between each of the color patches in the color adjustment patch group CPA and the paper white portion are identifiable is generated. Then, the processing to generate color chart data ends.

As described above, in the color chart CCA generated in the image forming system 1 according to the present modification, the color adjustment patch group CPA includes a boundary line arranged at the boundary between each of the color patches and a color patch adjacent to each of the color patches when the color difference between each of the color patches in the color adjustment patch group CPA and the color patch adjacent to each of the color patches is determined to be smaller than the predetermined threshold value. Thus, a color chart in which each of the color patches to be used for the color adjustment is easily identified is also obtained.

Although the determination of whether the colors of color patches adjacent to each other are similar is executed using the color difference in the first embodiment and the lightness in the second embodiment, saturation may be used alternatively.

In a case where at least a portion of the functional units of the image forming apparatus 10 and the information processing apparatus 20 according to the above-described embodiments and modification is implemented by execution of a computer program, the program can be stored in advance, for example, a ROM. Each of the programs to be executed by the image forming apparatus 10 and the information processing apparatus 20 according to the embodiments and modification described above may be configured to be recorded in any computer-readable recording medium, such as a compact disc-read-only memory (CD-ROM), a flexible disk (FD), a compact disc-recordable (CD-R), or a DVD, in an installable or executable file format and provided as a computer program product. Alternatively, each of the programs to be executed by the image forming apparatus 10 and the information processing apparatus 20 according to the embodiments and modification described above may be stored on a computer connected to a network such as the Internet so that the programs can be downloaded through the network and provided. Still, alternatively, each of the programs to be executed by the image forming apparatus 10 and the information processing apparatus 20 according to the embodiments and modification described above may be configured to be provided or distributed via a network such as the Internet. Each of the programs to be executed by the image forming apparatus 10 and the information processing apparatus 20 according to the embodiments and modification described above has a module structure including at least one of the above-described functional units. As actual hardware, the CPU 501 (or CPU 601) reads the corresponding program from the above-described ROM and executes the corresponding program to load the above-described functional units onto a main storage device and generate the functional units on the main storage device.

Aspects of the present disclosure are, for example, as follows.

Aspect 1

A method of creating color chart data to be used for executing color adjustment on an image forming apparatus includes obtaining, from a color chart printed out by the image forming apparatus, color chart data that includes a color adjustment patch group in which a plurality of color patches used for executing the color adjustment are arranged adjacent to each other, determining whether the color of each of the color patches included in the color adjustment patch group and the color of a color patch adjacent to each of the color patches are similar, and in the case where the color of each of the color patches and the color of the color patch adjacent to each of the color patches are determined to be similar, creating color chart data in which each of the color patches and the color patch adjacent to each of the color patches are arranged not to be adjacent to each other.

Aspect 2

The method of creating color chart data according to Aspect 1, further includes replacing each of the color patches with a color patch different from each of the color patches. The method of determining includes calculating a first color difference between each of the color patches included in the color adjustment patch group and a color patch adjacent to each of the color patches. In the case where the first color difference is determined to be smaller than a predetermined threshold value, the method of replacing includes replacing each of the color patches with a color patch different from each of the color patches in a manner that each of the color patches included in the color adjustment patch group is arranged so that the first color difference between each of the color patches and the color patch adjacent to each of the color patches becomes equal to or greater than the predetermined threshold value.

Aspect 3

In the method of creating color chart data according to Aspect 2, the method of determining includes calculating a second color difference between a color patch in contact with a paper white portion among the color patches included in the color adjustment patch group and the paper white portion. In the case where the second color difference is determined to be smaller than the predetermined threshold value, the method of replacing includes replacing each of the color patches with a color patch different from each of the color patches in a manner that each of the color patches included in the color adjustment patch group is arranged so that the second color difference between the color patch in contact with the paper white portion and the paper white portion becomes equal to or greater than the predetermined threshold value.

Aspect 4

In the method of creating color chart data according to Aspect 1, a color boundary line based on each of the color patches in the color adjustment patch group and a color patch adjacent to each of the color patches is arranged at a boundary between each of the color patches and the color patch adjacent to each of the color patches.

Aspect 5

In the method of creating color chart data according to Aspect 4, the method of determining includes calculating an average lightness of each of the color patches included in the color adjustment patch group and a color patch adjacent to each of the color patches. In the case where the average lightness is determined to be equal to or greater than another predetermined threshold value, the method of determining includes arranging a black boundary line at a boundary between each of the color patches and the color patch adjacent to each of the color patches. In the case where the average lightness is determined to be smaller than the other predetermined threshold value, the method of determining includes arranging a white boundary line at a boundary between each of the color patches and the color patch adjacent to each of the color patches.

Aspect 6

In the method of creating color chart data according to Aspect 4 or 5, the method of determining includes calculating a color difference between each of the color patches included in the color adjustment patch group and a color patch adjacent to each of the color patches. In the case where the color difference is determined to be smaller than still another predetermined threshold value, the method of determining includes arranging one of the black boundary line and the white boundary line at a boundary between each of the color patches and the color patch adjacent to each of the color patches.

Aspect 7

In the method of creating color chart data according to Aspect 4 or 5, the method of determining further includes setting, to black, a boundary line at a boundary between a color patch in contact with a paper white portion among the color patches included in the color adjustment patch group and the paper white portion.

Aspect 8

An information processing apparatus for creating color chart data to be used for executing color adjustment on an image forming apparatus includes a generation unit that obtains color chart data including a color adjustment patch group in which a plurality of color patches used for executing the color adjustment are arranged adjacent to each other from a color chart printed out by the image forming apparatus to generate the color chart. The generation unit includes a determination means that determines whether the color of each of the color patches included in the color adjustment patch group and the color of a color patch adjacent to each of the color patches are similar. In the case where the determination means determines that the color of each of the color patches and the color of a color patch adjacent to each of the color patches are similar, the generation unit creates color chart data so that each of the color patches and the color patch adjacent to each of the color patches are arranged not to be adjacent to each other.

Aspect 9

In the information processing apparatus for creating color chart data according to Aspect 8, the generation unit further includes a replacement means that replaces each of the color patches with a color patch different from each of the color patches. The determination means calculates a color difference between each of the color patches included in the color adjustment patch group and a color patch adjacent to each of the color patches. In the case where the color difference is determined to be smaller than a predetermined threshold value, the replacement means replaces each of the color patches with a color patch different from each of the color patches in a manner that each of the color patches included in the color adjustment patch group is arranged so that the color difference between each of the color patches and the color patch adjacent to each of the color patches becomes equal to or greater than the predetermined threshold value.

Aspect 10

In the information processing apparatus for creating color chart data according to Aspect 8, the generation unit arranges a color boundary line based on each of the color patches in the color adjustment patch group and a color patch adjacent to each of the color patches at a boundary between each of the color patches and the color patch adjacent to each of the color patches.

Aspect 11

In the information processing apparatus for creating color chart data according to Aspect 10, the generation unit calculates an average lightness of each of the color patches included in the color adjustment patch group and a color patch adjacent to each of the color patches. In the case where the average lightness is determined to be equal to or greater than another predetermined threshold value, the generation unit includes an arrangement means to arrange a black boundary line at a boundary between each of the color patches and the color patch adjacent to each of the color patches. In the case where the average lightness is determined to be smaller than the other predetermined threshold value, the generation unit includes an arrangement means to arrange a white boundary line at a boundary between each of the color patches and the color patch adjacent to each of the color patches.

Aspect 12

In the information processing apparatus for creating color chart data according to Aspect 10 or 11, the generation unit calculates a color difference between each of the color patches included in the color adjustment patch group and a color patch adjacent to each of the color patches. In the case where the color difference is determined to be smaller than still another predetermined threshold value, the determination unit arranges one of the black boundary line and the white boundary line at a boundary between each of the color patches and the color patch adjacent to each of the color patches.

Aspect 13

A color chart is created by the method of creating color chart data according to any one of Aspects 1 to 7, in which each of the color patches and the color patch adjacent to each of the color patches are arranged not to be adjacent to each other.

Aspect 14

An image forming system includes the information processing apparatus for creating color chart data according to any one of Aspects 8 to 12, an image forming apparatus that prints out a color chart based on the color chart data acquired from the information processing apparatus for creating color chart data, and an image reading apparatus that reads the color chart printed out by the image forming apparatus to generate color information data. The information processing apparatus for creating color chart data includes an obtaining unit that obtains the color information data generated by the image reading apparatus, an identification unit that identifies the image forming apparatus from identification information included in the color information data, an extraction unit that identifies each of the color patches in the color adjustment patch group from the color information data obtained by the obtaining unit and extracts a colorimetric value of each of the color patches, and a color adjustment unit that creates, based on the colorimetric value of each of the color patches extracted by the extraction unit, a profile to be applied to the image forming apparatus identified by the identification unit.

Aspect 15

A carrier medium carries computer-readable codes for controlling a computer system to perform the method of creating color chart data according to any one of Aspects 1 to 7.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carries out or is programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A computer-implemented method of creating color chart data to be used for executing color adjustment on an image forming apparatus, the method comprising:

obtaining, from a color chart printed out by the image forming apparatus, color chart data including a color adjustment patch group in which a plurality of color patches used for executing the color adjustment are already arranged adjacent to each other;

determining, for one or more of the plurality of color patches included in the color adjustment patch group in which the plurality of color patches used for executing the color adjustment are already arranged adjacent to each other, whether a color of a color patch and a color of an adjacent color patch adjacent to the color patch are similar;

calculating a first color difference between the color of the color patch and the color of the adjacent color patch included in the color adjustment patch group in which the plurality of color patches used for executing the color adjustment are already arranged adjacent to each other; and based on a determination that the color of the color patch and the color of the adjacent color patch included in the color adjustment patch group in which the plurality of color patches used for executing the color adjustment are already arranged adjacent to each other are similar, creating new color chart data in which the color patch and the adjacent color patch that are similar in color are arranged not to be adjacent to each other, wherein, in a case that the first color difference between the color of the color patch and the color of the adjacent color patch included in the color adjustment patch group in which the plurality of color patches used for executing the color adjustment are already arranged adjacent to each other is determined to be smaller than a threshold value, creating the new color chart data includes replacing the color patch with a new color patch having a color different from the color of the adjacent color patch such that a new first color difference between the color of the new color patch and the color of the adjacent color patch becomes equal to or greater than the threshold value.

2. The method of creating color chart data according to claim 1, wherein:

in a case that the color patch is arranged on an outer periphery of the color adjustment patch group, the method further comprises calculating a second color difference between the color of the color patch and a color of paper on which the color chart is printed; and in a case that the second color difference is determined to be smaller than the threshold value, creating the new color chart data includes replacing the color patch with a new color patch having a color different from the color of the adjacent color patch such that a new second color difference between the color of the new color patch and the color of the paper becomes equal to or greater than the threshold value.

3. The method of creating color chart data according to claim 1, further comprising arranging a boundary line having a color that is determined based on the color patch and the adjacent color patch of the plurality of color patches in the color adjustment patch group at a boundary between the color patch and the adjacent color patch of the plurality of color patches.

4. The method of creating color chart data according to claim 3, further comprising:

calculating an average lightness of the color patch and the adjacent color patch of the plurality of color patches included in the color adjustment patch group;

in a case that the average lightness is determined to be equal to or greater than another threshold value, the arranging includes setting the color of the boundary line to black; and in a case that the average lightness is determined to be smaller than the other threshold value, the arranging includes setting the color of the boundary line to white.

5. The method of creating color chart data according to claim 3, further comprising:

calculating a color difference between the color patch and the adjacent color patch of the plurality of color patches included in the color adjustment patch group; and based on a determination that the color difference is smaller than still another threshold value, arranging the boundary line at the boundary between the color patch and the adjacent color patch.

6. The method of creating color chart data according to claim 3, wherein in a case that the color patch is arranged on an outer periphery of the color adjustment patch group, the method further comprises setting, to black, a boundary line at an outer boundary between the color patch and a margin of paper on which the color chart is printed.

7. A color chart created by the method of creating color chart data according to claim 1, in which the color patch and the adjacent color patch that are similar in color are arranged not to be adjacent to each other.

8. The method of creating color chart data according to claim 1, wherein the determining includes determining whether the color of the color patch and colors of color patches adjacent to the color patch in vertical, horizontal, and oblique directions are similar.

9. The method of creating color chart data according to claim 1, further comprising:

counting a number of times the color patch is replaced with a different color patch; and in a case that the number of times is equal to or greater than a predetermined count threshold, determining that generation of the new color chart data is not executable.

10. The method of creating color chart data according to claim 1, wherein the replacing includes replacing the color patch with a color patch selected from color patches subsequent to the color patch in a raster scanning order of the color adjustment patch group.

11. An information processing apparatus for creating color chart data to be used for executing color adjustment for an image forming apparatus comprising:

circuitry configured to:

obtain, from a color chart printed out by the image forming apparatus, color chart data including a color adjustment patch group in which a plurality of color patches used for executing the color adjustment are already arranged adjacent to each other;

determine, for one or more of the plurality of color patches included in the color adjustment patch group in which the plurality of color patches used for executing the color adjustment are already arranged adjacent to each other, whether a color of a color patch and a color of an adjacent color patch adjacent to the color patch are similar;

calculate a first color difference between the color of the color patch and the color of the adjacent color patch included in the color adjustment patch group in which the plurality of color patches used for executing the color adjustment are already arranged adjacent to each other; and based on a determination that the color of the color patch and the color of the adjacent color patch included in the color adjustment patch group in which the plurality of color patches used for executing the color adjustment are already arranged adjacent to each other are similar, create new color chart data in which the color patch and the adjacent color patch that are similar in color are arranged not to be adjacent to each other, wherein, in a case that the first color difference between the color of the color patch and the color of the adjacent color patch included in the color adjustment patch group in which the plurality of color patches used for executing the color adjustment are already arranged adjacent to each other is determined to be smaller than a threshold value, create the new color chart data includes replacing the color patch with a new color patch having a color different from the color of the adjacent color patch such that a new first color difference between the color of the new color patch and the color of the adjacent color patch becomes equal to or greater than the threshold value.

12. The information processing apparatus for creating color chart data according to claim 11, wherein the circuitry is further configured to arrange a boundary line having a color that is determined based on the color patch and the adjacent color patch of the plurality of color patches in the color adjustment patch group at a boundary between the color patch and the adjacent color patch of the plurality of color patches.

13. The information processing apparatus for creating color chart data according to claim 12, wherein the circuitry is configured to:

calculate an average lightness of the color patch and the adjacent color patch of the plurality of color patches included in the color adjustment patch group;

in a case that the average lightness is determined to be equal to or greater than another threshold value, set the color of the boundary line to black; and in a case that the average lightness is determined to be smaller than the other threshold value, set the color of the boundary line to white.

14. The information processing apparatus for creating color chart data according to claim 12, wherein the circuitry is configured to:

calculate a color difference between the color patch and the adjacent color patch of the plurality of color patches included in the color adjustment patch group; and based on a determination that the color difference is smaller than still another threshold value, arrange the boundary line at the boundary between the color patch and the adjacent color patch.

15. An image forming system comprising:

the information processing apparatus for creating color chart data according to claim 11;

an image forming apparatus configured to print out a color chart based on the new color chart data acquired from the information processing apparatus; and an image reading apparatus configured to read the color chart printed out by the image forming apparatus to generate color information data, wherein the circuitry is configured to:

obtain the color information data generated by the image reading apparatus;

identify the image forming apparatus based on identification information included in the color information data;

extract a colorimetric value of each of a plurality of color patches in a color adjustment patch group represented by the new color chart data based on the color information data; and create, based on the colorimetric value of each of the plurality of color patches, a profile to be applied to the image forming apparatus.

16. A non-transitory recording medium storing a plurality of program codes which, when executed by one or more processors, causes the one or more processors to perform the method of creating color chart data, the method comprising:

obtaining, from a color chart printed out by an image forming apparatus, color chart data including a color adjustment patch group in which a plurality of color patches used for executing the color adjustment are already arranged adjacent to each other;

determining, for one or more of the plurality of color patches included in the color adjustment patch group in which the plurality of color patches used for executing the color adjustment are already arranged adjacent to each other, whether a color of a color patch and a color of an adjacent color patch adjacent to the color patch are similar;

calculating a first color difference between the color of the color patch and the color of the adjacent color patch included in the color adjustment patch group in which the plurality of color patches used for executing the color adjustment are already arranged adjacent to each other; and based on a determination that the color of the color patch and the color of the adjacent color patch included in the color adjustment patch group in which the plurality of color patches used for executing the color adjustment are already arranged adjacent to each other are similar, creating new color chart data in which the color patch and the adjacent color patch that are similar in color are arranged not to be adjacent to each other, wherein, in a case that the first color difference between the color of the color patch and the color of the adjacent color patch included in the color adjustment patch group in which the plurality of color patches used for executing the color adjustment are already arranged adjacent to each other is determined to be smaller than a threshold value, creating the new color chart data includes replacing the color patch with a new color patch having a color different from the color of the adjacent color patch such that a new first color difference between the color of the new color patch and the color of the adjacent color patch becomes equal to or greater than the threshold value.

17. The information processing apparatus for creating color chart data according to claim 11, wherein the circuitry is further configured to determine whether the color of the color patch and colors of color patches adjacent to the color patch in vertical, horizontal, and oblique directions are similar.

18. The information processing apparatus for creating color chart data according to claim 11, wherein the circuitry is further configured to:

count a number of times the color patch is replaced with a different color patch; and in a case that the number of times is equal to or greater than a predetermined count threshold, determine that generation of the new color chart data is not executable.

19. The information processing apparatus for creating color chart data according to claim 11, wherein the circuitry is further configured to replace the color patch with a color patch selected from color patches subsequent to the color patch in a raster scanning order of the color adjustment patch group.

* * * * *